United States Patent
Wang

(10) Patent No.: US 10,519,304 B2
(45) Date of Patent: *Dec. 31, 2019

(54) POLYETHYLENE COMPOSITIONS AND CLOSURES MADE FROM THEM

(71) Applicant: NOVA Chemicals (International) S.A., Fribourg (CH)

(72) Inventor: XiaoChuan Wang, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 254 days.

This patent is subject to a terminal disclaimer.

(21) Appl. No.: 15/460,808

(22) Filed: Mar. 16, 2017

(65) Prior Publication Data

US 2017/0190889 A1 Jul. 6, 2017

Related U.S. Application Data

(63) Continuation of application No. 15/152,601, filed on May 12, 2016, now Pat. No. 9,637,628, which is a continuation of application No. 14/828,962, filed on Aug. 18, 2015, now Pat. No. 9,371,442, which is a continuation-in-part of application No. 14/557,996, filed on Dec. 2, 2014, now Pat. No. 9,221,966, which is a continuation of application No. 13/601,509, filed on Aug. 31, 2012, now Pat. No. 8,962,755.

(30) Foreign Application Priority Data

Sep. 19, 2011 (CA) .................................. 2752407

(51) Int. Cl.
| | | |
|---|---|---|
| C08L 23/08 | (2006.01) | |
| C08L 23/06 | (2006.01) | |
| C08F 210/16 | (2006.01) | |
| C08F 2/00 | (2006.01) | |
| C08F 10/02 | (2006.01) | |
| B29C 45/00 | (2006.01) | |
| B65D 41/04 | (2006.01) | |
| B29K 23/00 | (2006.01) | |
| B29C 43/00 | (2006.01) | |
| C08F 4/659 | (2006.01) | |
| C08F 4/6592 | (2006.01) | |

(52) U.S. Cl.
CPC ...... C08L 23/0815 (2013.01); B29C 45/0001 (2013.01); B65D 41/04 (2013.01); C08F 2/001 (2013.01); C08F 10/02 (2013.01); C08F 210/16 (2013.01); C08L 23/06 (2013.01); C08L 23/08 (2013.01); B29C 43/003 (2013.01); B29K 2023/065 (2013.01); C08F 4/6592 (2013.01); C08F 4/65908 (2013.01); C08F 4/65912 (2013.01); C08L 2203/10 (2013.01); C08L 2205/025 (2013.01); C08L 2205/24 (2013.01)

(58) Field of Classification Search
CPC .................. C08L 23/08; C08L 23/0815; C08L 2205/025; C08F 2/001; C08F 210/16; C08F 297/06; C08F 297/08; C08F 297/083; B65D 41/00; B65D 43/00; B29C 43/003; B29C 45/0001; B29K 2023/06; B29K 2023/0608; B29K 2023/065; B29K 2023/08

See application file for complete search history.

(56) References Cited

U.S. PATENT DOCUMENTS

| | | |
|---|---|---|
| 3,645,992 A | 2/1972 | Elston |
| 4,701,432 A | 10/1987 | Welborn, Jr. |
| 4,798,081 A | 1/1989 | Hazlitt et al. |
| 4,808,561 A | 2/1989 | Welborn, Jr. |
| 4,935,397 A | 6/1990 | Chang |
| 4,937,301 A | 6/1990 | Chang |
| 5,055,438 A | 10/1991 | Canich |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,206,075 A | 4/1993 | Hodgson, Jr. |
| 5,292,845 A | 3/1994 | Kawasaki et al. |
| 5,324,800 A | 6/1994 | Welborn, Jr. et al. |
| 5,342,868 A | 8/1994 | Kimura et al. |
| 5,376,439 A | 12/1994 | Hodgson et al. |

(Continued)

FOREIGN PATENT DOCUMENTS

| | | |
|---|---|---|
| EP | 2 017 302 A1 | 1/2009 |
| WO | 93/03093 A1 | 2/1993 |

(Continued)

OTHER PUBLICATIONS

ASTM D5227-01 (Reapproved 2008)—Standard Test Method for Measurement of Hexane Extractable Content of Polyolefins1—Copyright by ASTM International; Current edition approved Nov. 1, 2008. Published Mar. 2009. Originally approved in 1992. Last previous edition approved in 2001 as D5227-01. pp. 1-4.
ASTM D648-07—Standard Test Method for Deflection Temperature of Plastics Under Flexural Load in the Edgewise Position1—Copyright by ASTM International; Current edition approved Mar. 1, 2007. Published Mar. 2007. Originally approved in 1941. Last previous edition approved in 2006 as D648-06. pp. 1-13.
ASTM D1525-09—Standard Test Method for Vicat Softening Temperature of Plastics1, Copyright by ASTM International; Current edition approved Nov. 15, 2009. Published Dec. 2009. Originally approved in 1958. Last previous edition approved in 2007 as D1525-07. pp. 1-10.

(Continued)

*Primary Examiner* — Roberto Rabago
(74) *Attorney, Agent, or Firm* — Julie L. Heinrich

(57) ABSTRACT

A dual reactor solution process gives high density polyethylene compositions containing a first ethylene copolymer and a second ethylene copolymer and which have good processability, stiffness, and environmental stress crack resistance. The polyethylene compositions are suitable for compression molding or injection molding applications and are particularly useful in the manufacture of caps and closures for bottles.

15 Claims, 7 Drawing Sheets

(56) References Cited

U.S. PATENT DOCUMENTS

| | | |
|---|---|---|
| 5,382,630 A | 1/1995 | Stehling et al. |
| 5,382,631 A | 1/1995 | Stehling et al. |
| 5,494,965 A | 2/1996 | Harlin et al. |
| 5,633,394 A | 5/1997 | Welborn, Jr. et al. |
| 5,703,187 A | 12/1997 | Timmers |
| 5,858,491 A | 1/1999 | Guessens et al. |
| 5,981,636 A | 11/1999 | Amos et al. |
| 5,981,664 A | 11/1999 | Neumann et al. |
| 6,002,033 A | 12/1999 | Razavi et al. |
| 6,034,021 A | 3/2000 | Wilson et al. |
| 6,063,871 A | 5/2000 | Kishine et al. |
| 6,063,879 A | 5/2000 | Stephan et al. |
| 6,114,481 A | 9/2000 | McMeeking et al. |
| 6,194,520 B1 | 2/2001 | Cheruvu et al. |
| 6,235,672 B1 | 5/2001 | McKay et al. |
| 6,277,931 B1 | 8/2001 | Jaber et al. |
| 6,342,463 B1 | 1/2002 | Stephan et al. |
| 6,372,864 B1 | 4/2002 | Brown |
| 6,465,551 B1 | 10/2002 | Zhao et al. |
| 6,489,413 B1 | 12/2002 | Floyd et al. |
| 6,545,093 B1 | 4/2003 | de Lange et al. |
| 6,599,971 B2 | 7/2003 | Dotson et al. |
| 6,689,847 B2 | 2/2004 | Mawson et al. |
| 6,777,509 B2 | 8/2004 | Brown et al. |
| 6,806,338 B2 | 10/2004 | Baann et al. |
| 6,809,154 B2 | 10/2004 | Lindahl et al. |
| 6,946,521 B2 | 9/2005 | Miserque et al. |
| 6,984,695 B2 | 1/2006 | Brown et al. |
| 7,022,770 B2 | 4/2006 | Lustiger et al. |
| 7,250,474 B2 | 7/2007 | Maziers |
| 7,307,126 B2 | 12/2007 | Lustiger et al. |
| 7,396,878 B2 | 7/2008 | Lustiger et al. |
| 7,396,881 B2 | 7/2008 | Lustiger et al. |
| 7,592,395 B2 | 9/2009 | Poloso |
| 7,868,106 B2 | 1/2011 | Stephenne et al. |
| 7,875,690 B2 | 1/2011 | Graham et al. |
| 7,928,051 B2 | 4/2011 | Kipke et al. |
| 8,022,143 B2 | 9/2011 | Wang |
| 8,101,693 B2 | 1/2012 | Van Asseldonk et al. |
| 8,129,472 B2 | 3/2012 | Turner et al. |
| 8,129,489 B2 | 3/2012 | Okamoto et al. |
| 8,318,883 B1 | 11/2012 | Yang et al. |
| 8,580,895 B2 | 11/2013 | Standaert et al. |
| 8,962,755 B2 * | 2/2015 | Wang ............... C08L 23/08 525/53 |
| 9,056,970 B2 | 6/2015 | Davis et al. |
| 9,074,082 B2 | 7/2015 | Wang et al. |
| 9,221,966 B2 * | 12/2015 | Wang ............... C08L 23/08 |
| 9,371,442 B2 * | 6/2016 | Wang ............... C08L 23/06 |
| 9,637,628 B2 * | 5/2017 | Wang ............... C08L 23/06 |
| 2005/0004315 A1 | 1/2005 | De Cambry De Baudimont et al. |
| 2005/0267249 A1 | 12/2005 | Wilson et al. |
| 2006/0241256 A1 | 10/2006 | Baann et al. |
| 2006/0247373 A1 | 11/2006 | Goyal et al. |
| 2009/0062463 A1 | 3/2009 | Backmann et al. |
| 2009/0198018 A1 | 8/2009 | Baeckman et al. |
| 2009/0203848 A1 | 8/2009 | Gustafsson et al. |
| 2010/0121006 A1 | 5/2010 | Cho et al. |
| 2010/0261848 A1 | 10/2010 | Wang |
| 2011/0091674 A1 | 4/2011 | Backman et al. |
| 2014/0371397 A1 | 12/2014 | Ribour et al. |

FOREIGN PATENT DOCUMENTS

| | | |
|---|---|---|
| WO | 00/71615 A1 | 11/2000 |
| WO | 2005/121239 A2 | 12/2005 |
| WO | 2006/048253 A1 | 5/2006 |
| WO | 2006/048254 A1 | 5/2006 |
| WO | 2007/060007 A1 | 5/2007 |
| WO | 2007/117520 A2 | 10/2007 |
| WO | 2007/130515 A2 | 10/2007 |
| WO | 2008/136849 A1 | 11/2008 |
| WO | 2010/088265 A1 | 8/2010 |
| WO | 2011/050042 A1 | 4/2011 |
| WO | 2014/180989 A1 | 11/2014 |
| WO | 2015/042561 A1 | 3/2015 |
| WO | 2015/042562 A1 | 3/2015 |

OTHER PUBLICATIONS

ASTM D256-10—Standard Test Methods for Determining the Izod Pendulum Impact Resistance of Plastics1, Copyright by ASTM International; Current edition approved may 1, 2010. Published Jun. 2010. Originally approved in 1926. Last previous edition approved in 2006 as D256-06a. pp. 1-20.

ASTM D638-10—Standard Test Method for Tensile Properties of Plastics—Copyright ASTM International; Current edition approved May 15, 2010. Published Jun. 2010. Originally approved in 1941. Last previous edition approved in 2008 as D638-08. pp. 1-16.

ASTM D790-10—Standard Test Methods for Flexural Properties of Unreinforced and Reinforced Plastics and Electrical Insulating Materials1—Copyright by ASTM International; Current edition approved Apr. 1, 2010. Published Apr. 2010. Originally approved in 1970. Last previous edition approved in 2007 as D790-07. pp. 1-11.

ASTM D1238-10—Standard Test Method for Melt Flow Rates of Thermoplastics by Extrusion Plastometer1—Copyright by ASTM International; Current edition approved Feb. 1, 2010. Published Mar. 2010. Originally approved in 1965. Last previous edition approved in 2004 as D1238-04c. pp. 1-15.

ASTM D1693-12—Standard Test Method for Environmental Stress-Cracking of Ethylene Plastics1—Copyright by ASTM International; Current edition approved Apr. 1, 2012. Published May 2012. Originally approved in 1959. Last previous edition approved in 2008 as D1693-08. pp. 1-11.

Wild, L.; Ryle, T.R.; Knobeloch, D.C. and Peat, I.R.; Determination of Branching Distributions in Polyethylene and Ethylene Copolymers; Journal of Polymer Science: Polymer Physics Edition, vol. 20, 1982 John Wiley & Sons Inc., pp. 441-455.

Randall, James C.; A Review of High Resolution Liquid 13Carbon Nuclear Magnetic Resonance Characterizations of Ethylene-Based Polymers; JMS-Rev. Macromol. Chem. Phys., C29 (2 & 3), (1989), pp. 201-317.

* cited by examiner

POLYETHYLENE COMPOSITIONS AND CLOSURES MADE FROM THEM

CROSS REFERENCE TO RELATED PATENT APPLICATION

This application is a continuation of U.S. application Ser. No. 15/152,601, filed on May 12, 2016, which is a continuation of U.S. application Ser. No. 14/828,962, filed on Aug. 18, 2015, entitled "POLYETHYLENE COMPOSITION AND CLOSURES MADE FROM THEM", now U.S. Pat. No. 9,371,442, which was granted Jun. 21, 2016, which is a continuation-in-part of U.S. application Ser. No. 14/557,996 filed on Dec. 2, 2014, now U.S. Pat. No. 9,221,966, which was granted Dec. 29, 2015, entitled "POLYETHYLENE COMPOSITIONS AND CLOSURES FOR BOTTLES", which is herein incorporated by reference in its entirety and which is a continuation of U.S. application Ser. No. 13/601,509, filed on Aug. 31, 2012, now U.S. Pat. No. 8,962,755, which was granted on Feb. 25, 2015, entitled "POLYETHYLENE COMPOSITIONS AND CLOSURES FOR BOTTLES", which are herein incorporated by reference in their entirety, and which claim priority and the benefit of Canadian Application No. 2,752,407, filed Sep. 19, 2011.

The present invention relates to polyethylene compositions that are useful in the manufacture of molded articles such as closures for bottles.

Polymer compositions useful for molding applications, specifically the manufacture of caps and closures for bottles are well known. Screw closures for example, are typically made from polypropylene (PP) in order to achieve the necessary cap strength, however, an inner liner composed of a soft polymer is required to provide necessary seal properties. The soft inner liner can be made from ethylene/vinyl acetate (EVA), polyvinyl chloride (PVC), butyl rubber or other suitable material. The two-part cap is costly, and single part constructions are preferred to reduce cost.

Accordingly, one-piece closures, such as screw caps have more recently been made from polyethylene resins. The use of high density resin is required if the closures are to have sufficient stiffness, while broader molecular weight distributions are desirable to impart good flow properties and to improve environmental stress crack resistance (ESCR).

Polyethylene blends produced with conventional Ziegler-Natta or Phillips type catalysts systems can be made having suitably high density and ESCR properties, see, for example, WO 00/71615 and U.S. Pat. No. 5,981,664. However, the use of conventional catalyst systems typically produces significant amounts of low molecular weight polymer chains having high comonomer contents, which results in resins having non-ideal organoleptic properties.

Examples of high density multimodal polyethylene blends made using conventional catalyst systems for the manufacture of caps or closures are taught in U.S. Patent Application Publication Nos. 2005/0004315A1; 2005/0267249A1; as well as WO 2006/048253, WO 2006/048254, WO 2007/060007; and EP 2,017,302A1. Further high density, multimodal polyethylene blends made by employing conventional Ziegler-Natta catalysts are disclosed in U.S. Patent Application Publication Nos. 2009/0062463A1; 2009/0198018; 2009/0203848 and in WO 2007/130515, WO 2008/136849 and WO 2010/088265.

In contrast to traditional catalysts, the use of so called single site catalysts (such as "metallocene" and "constrained geometry" catalysts) provides resin having lower catalyst residues and improved organoleptic properties as taught by U.S. Pat. No. 6,806,338. The disclosed resins are suitable for use in molded articles. Further resins comprising metallocene catalyzed components and which are useful for molding applications are described in U.S. Pat. Nos. 7,022,770; 7,307,126; 7,396,878 and 7,396,881 and 7,700,708.

U.S. Patent Application Publication No. 2011/0165357A1 discloses a blend of metallocene catalyzed resins which is suitable for use in pressure resistant pipe applications.

U.S. Patent Application Publication No. 2006/0241256A1 teaches blends formulated from polyethylenes made using a hafnocene catalyst in the slurry phase.

A bimodal resin having a relatively narrow molecular weight distribution and long chain branching is described in U.S. Pat. No. 7,868,106. The resin is made using a bis-indenyl type metallocene catalyst in a dual slurry loop polymerization process and can be used to manufacture caps and closures.

U.S. Pat. No. 6,642,313 discloses multimodal polyethylene resins which are suitable for use in the manufacture of pipes. A dual reactor solution process is used to prepare the resins in the presence of a phosphinimine catalyst.

Narrow molecular weight polyethylene blends comprising a metallocene produced polyethylene component and a Zielger-Natta or metallocene produced polyethylene component are reported in U.S. Pat. No. 7,250,474. The blends can be used in blow molding and injection molding applications such as for example, milk bottles and bottle caps respectively.

In U.S. Pat. No. 8,022,143, we disclosed a resin composition having a good balance of toughness, ESCR, processability, and organoleptic properties for use in the manufacture of caps and closures. The resins were made using a single site catalyst system in a dual reactor solution process, to provide bimodal polyethylene compositions in which comonomer was present in both a high and a low molecular weight component. The disclosed resins had a normal comonomer distribution in that the low molecular weight component had a larger amount of comonomer than did the high molecular weight component. We have now found that by adding more comonomer to the high molecular weight component of these resins, we can improve the ESCR properties. The polyethylene compositions provided by the present invention also have good organoleptic properties, balanced rheological and mechanical properties and are suitable for use in the manufacture of closures for bottles, or containers or pouches.

Provided in one embodiment is a polyethylene composition that can be used in the manufacture of caps and closures for bottles, containers or pouches.

Provided in another embodiment is a polyethylene composition which has an improved ESCR while maintaining low shear viscosity values at high shear rates which is desirable for high-speed injection or compression molding applications.

Embodiments of the invention include caps and closures comprising a polyethylene composition made by a two reactor solution phase process and a single site catalyst. Plaques made from the polyethylene compositions have a good balance of mechanical, processing and organoleptic properties.

Provided in another embodiment is a closure for bottles, containers or pouches, the closure comprising a bimodal polyethylene composition comprising:

(1) 10 to 70 wt % of a first ethylene copolymer having a melt index, 12, of less than 0.4 g/10 min; a molecular weight distribution, $M_w/M_n$, of less than 3.0; and a density of from 0.920 to 0.955 g/cm$^3$; and (2) 90 to 30 wt % of a second ethylene copolymer having a melt index $I_2$, of from 100 to 10,000 g/10 min; a molecular weight distribution, $M_w/M_n$, of less than 3.0; and a density higher than the density of the first ethylene copolymer, but less than 0.967 g/cm$^3$;

wherein the density of the second ethylene copolymer is less than 0.037 g/cm$^3$ higher than the density of the first ethylene copolymer; the ratio of short chain branching in the first ethylene copolymer (SCB1) to the short chain branching in the second ethylene copolymer (SCB2) is greater than 0.5; and wherein the bimodal polyethylene composition has a molecular weight distribution, $M_w/M_n$, of from 3 to 11; a density of at least 0.949 g/cm$^3$; a melt index $I_2$, of from 0.4 to 5.0 g/10 min; an Mz of less than 400,000; a stress exponent of less than 1.50; and an ESCR Condition B (10% IGEPAL) of at least 20 hours.

Provided in another embodiment is a process to prepare a polyethylene composition, the polyethylene composition comprising:
(1) 10 to 70 wt % of a first ethylene copolymer having a melt index, $I_2$, of less than 0.4 g/10 min; a molecular weight distribution, $M_w/M_n$, of less than 3.0; and a density of from 0.920 to 0.955 g/cm$^3$; and
(2) 90 to 30 wt % of a second ethylene copolymer having a melt index $I_2$, of from 100 to 10,000 g/10 min; a molecular weight distribution, $M_w/M_n$, of less than 3.0; and a density higher than the density of the first ethylene copolymer, but less than 0.967 g/cm$^3$;

wherein the density of the second ethylene copolymer is less than 0.037 g/cm$^3$ higher than the density of the first ethylene copolymer; the ratio of short chain branching in the first ethylene copolymer (SCB1) to the short chain branching in the second ethylene copolymer (SCB2) is greater than 0.5; and wherein the polyethylene composition has a molecular weight distribution, $M_w/M_n$, of from 3 to 11; a density of at least 0.949 g/cm$^3$; a melt index $I_2$, of from 0.4 to 5.0 g/10 min; an Mz of less than 400,000; a stress exponent of less than 1.50; and an ESCR Condition B (10% IGEPAL) of at least 20 hours;

the process comprising contacting at least one single site polymerization catalyst system with ethylene and at least one alpha-olefin comonomer under solution polymerization conditions in at least two polymerization reactors.

Provided in another embodiment is a bimodal polyethylene composition comprising:
(1) 30 to 60 wt % of a first ethylene copolymer having a melt index, $I_2$, of less than 0.4 g/10 min; a molecular weight distribution, $M_w/M_n$, of less than 2.7; and a density of from 0.925 to 0.950 g/cm$^3$; and
(2) 70 to 40 wt % of a second ethylene copolymer having a melt index $I_2$, of from 100 to 10,000 g/10 min; a molecular weight distribution, $M_w/M_n$, of less than 2.7; and a density higher than the density of the first ethylene copolymer, but less than 0.966 g/cm$^3$;

wherein the density of the second ethylene copolymer is less than 0.037 g/cm$^3$ higher than the density of the first ethylene copolymer; the ratio of short chain branching in the first ethylene copolymer (SCB1) to the short chain branching in the second ethylene copolymer (SCB2) is greater than 0.5; and wherein the bimodal polyethylene composition has a molecular weight distribution, $M_w/M_n$, of from 4.0 to 10.0; a density of 0.949 to 0.957 g/cm$^3$; a melt index $I_2$, of from 0.4 to 5.0 g/10 min; a comonomer content of less than 0.75 mol % as determined by $^{13}$C NMR; an Mz of less than 400,000; a stress exponent of less than 1.50; and an ESCR Condition B (10% IGEPAL) of at least 20 hours.

Provided in another embodiment is a closure, said closure comprising a bimodal polyethylene composition comprising:
(1) 10 to 70 weight percent of a first ethylene copolymer having a melt index $I_2$, of less than 0.4 g/10 min; a molecular weight distribution $M_w/M_n$, of less than 2.7; and a density of from 0.920 to 0.955 g/cm$^3$; and
(2) 90 to 30 weight percent of a second ethylene copolymer having a melt index $I_2$, of from greater than 500 to 20,000 g/10 min; a molecular weight distribution $M_w/M_n$, of less than 2.7; and a density higher than the density of said first ethylene copolymer, but less than 0.967 g/cm$^3$;

wherein the density of said second ethylene copolymer is less than 0.037 g/cm$^3$ higher than the density of said first ethylene copolymer; the ratio (SCB1/SCB2) of the number of short chain branches per thousand carbon atoms in said first ethylene copolymer (SCB1) to the number of short chain branches per thousand carbon atoms in said second ethylene copolymer (SCB2) is greater than 1.0; and wherein said bimodal polyethylene composition has a molecular weight distribution $M_w/M_n$, of from 6 to 13; a density of at least 0.949 g/cm$^3$; a melt index $I_2$, of from 0.2 to 3.0 g/10 min; an Mz of less than 450,000; a stress exponent of less than 1.50, and an ESCR Condition B (10% IGEPAL) of at least 200 hours.

Provided in another embodiment is a process to prepare a polyethylene composition, said polyethylene composition comprising:
(1) 10 to 70 weight percent of a first ethylene copolymer having a melt index $I_2$, of less than 0.4 g/10 min; a molecular weight distribution $M_w/M_n$, of less than 2.7; and a density of from 0.920 to 0.955 g/cm$^3$; and
(2) 90 to 30 weight percent of a second ethylene copolymer having a melt index $I_2$, of from greater than 500 to 20,000 g/10 min; a molecular weight distribution $M_w/M_n$, of less than 2.7; and a density higher than the density of said first ethylene copolymer, but less than 0.967 g/cm$^3$;

wherein the density of said second ethylene copolymer is less than 0.037 g/cm$^3$ higher than the density of said first ethylene copolymer; the ratio (SCB1/SCB2) of the number of short chain branches per thousand carbon atoms in said first ethylene copolymer (SCB1) to the number of short chain branches per thousand carbon atoms in said second ethylene copolymer (SCB2) is greater than 1.0; and wherein said bimodal polyethylene composition has a molecular weight distribution $M_w/M_n$, of from 6 to 13; a density of at least 0.949 g/cm$^3$; a melt index $I_2$, of from 0.2 to 3.0 g/10 min; an Mz of less than 450,000; a stress exponent of less than 1.50, and an ESCR Condition B (10% IGEPAL) of at least 200 hours;

said process comprising contacting at least one single site polymerization catalyst system with ethylene and at least one alpha-olefin under solution polymerization conditions in at least two polymerization reactors.

Provided in another embodiment is a bimodal polyethylene composition comprising:
(1) 10 to 70 weight percent of a first ethylene copolymer having a melt index $I_2$, of less than 0.4 g/10 min; a molecular weight distribution $M_w/M_n$, of less than 2.7; and a density of from 0.920 to 0.955 g/cm$^3$; and
(2) to 30 weight percent of a second ethylene copolymer having a melt index $I_2$, of from greater than 500 to 20,000 g/10 min; a molecular weight distribution $M_w/M_n$, of less than 2.7; and a density higher than the density of said first ethylene copolymer, but less than 0.967 g/cm$^3$;

wherein the density of said second ethylene copolymer is less than 0.037 g/cm$^3$ higher than the density of said first ethylene copolymer; the ratio (SCB1/SCB2) of the number of short chain branches per thousand carbon atoms in said first ethylene copolymer (SCB1) to the number of short chain branches per thousand carbon atoms in said second ethylene copolymer (SCB2) is greater than 1.0; and wherein said bimodal polyethylene composition has a molecular weight distribution $M_w/M_n$, of from 6 to 13; a density of at least 0.949 g/cm$^3$; a melt index I$_2$, of from 0.2 to 3.0 g/10 min; an Mz of less than 450,000; a stress exponent of less than 1.50, and an ESCR Condition B (10% IGEPAL) of at least 200 hours.

In an embodiment of the invention, the bimodal polyethylene composition has an ESCR Condition B (10% IGEPAL) of at least 350 hours.

In an embodiment of the invention, the bimodal polyethylene composition has an ESCR Condition B (10% IGEPAL) of greater than 400 hours.

In an embodiment of the invention, the bimodal polyethylene composition has a molecular weight distribution, $M_w/M_n$, of from 8 to 12.

In an embodiment of the invention, the bimodal polyethylene composition has melt index I$_2$, of from 0.4 to 2.0 g/10 min.

In an embodiment of the invention, the second ethylene copolymer has a melt index I$_2$ of greater than 650 g/10 min.

In an embodiment of the invention, the second ethylene copolymer has a melt is density of less than 0.965 g/cm$^3$.

In an embodiment of the invention, the bimodal polyethylene composition has a z-average molecular weight distribution, Mz/Mw of less than 4.0

In an embodiment of the invention, the first ethylene copolymer has a density of from 0.925 to 0.950 g/cm$^3$.

In an embodiment of the invention, the bimodal polyethylene composition has a density of from 0.951 to 0.957 g/cm$^3$.

In an embodiment of the invention, the density of the second ethylene copolymer is less than 0.035 g/cm$^3$ higher than the density of the first ethylene copolymer.

In an embodiment of the invention, the first and second ethylene copolymers have a $M_w/M_n$ of less than 2.5.

In an embodiment of the invention, the bimodal polyethylene composition has a composition distribution breadth index (CDBI$_{25}$) of greater than 55% by weight.

In an embodiment of the invention, the second ethylene copolymer has a melt index, I$_2$ of from 1,000 to 20,000.

In an embodiment of the invention, the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 1.5.

In an embodiment of the invention, the bimodal polyethylene composition comprises: from 30 to 60 wt % of the first ethylene copolymer; and from 70 to 40 wt % of the second ethylene copolymer.

In an embodiment of the invention, the bimodal polyethylene composition has a shear viscosity ratio of ≥12.5.

In an embodiment of the invention, the bimodal polyethylene composition has a broadness factor defined as $(M_w/M_n)/(M_z/M_w)$ of at least 2.75.

DETAILED DESCRIPTION

Figure 1:
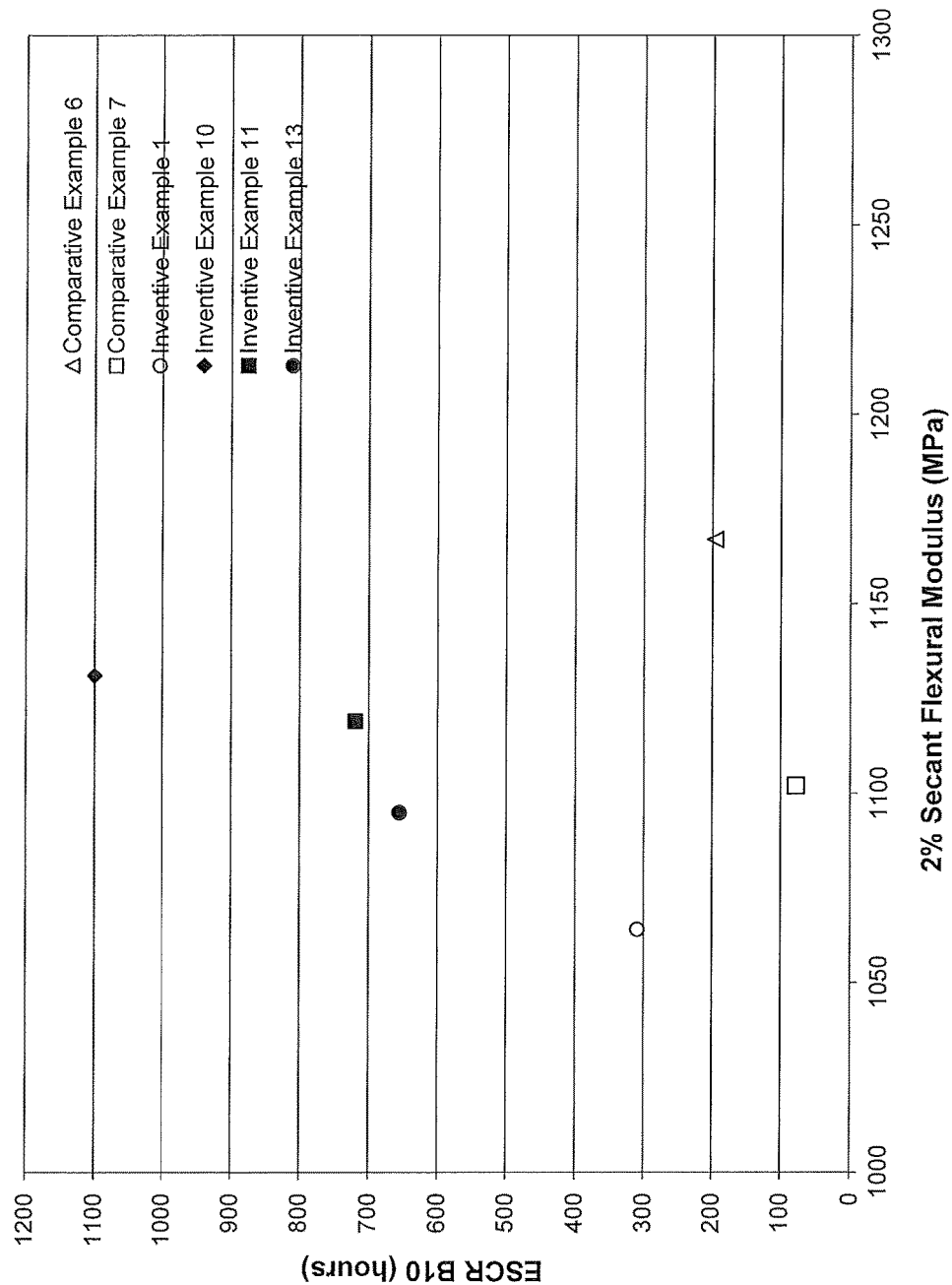
FIG. 1 shows a plot of the ESCR in hours (the ESCR B10 for a molded plaque) against the 2% secant flexural modulus (MPa) for selected inventive and comparative polyethylene composition examples.

The present invention is related to caps and closures for bottles or container or pouches and to the polyethylene compositions used to manufacture them. The polyethylene compositions are composed of at least two ethylene copolymer components: a first ethylene copolymer and a second ethylene copolymer. The polyethylene compositions of the invention have a good balance of processability, toughness, stiffness, environmental stress crack resistance, and organoleptic properties making them ideal materials for use in manufacturing caps and closures for bottles or containers or pouches.

By the term "ethylene copolymer" it is meant that the copolymer comprises both ethylene and at least one alpha-olefin comonomer.

The terms "cap" and "closure" are used interchangeably in the current invention, and both connote any suitably shaped molded article for enclosing, sealing, closing or covering etc., a suitably shaped opening, a suitably molded aperture, an open necked structure or the like used in combination with a container, a bottle, a jar, a pouch and the like.

The terms "homogeneous" or "homogeneously branched polymer" as used herein define homogeneously branched polyethylene which has a relatively narrow composition distribution, as indicated by a relatively high composition distribution breadth index (CDBI$_{50}$). That is, the comonomer is randomly distributed within a given polymer chain and a substantial portion of the polymer chains have same ethylene/comonomer ratio.

It is well known that metallocene catalysts and other so called "single site catalysts" incorporate comonomer more evenly than traditional Ziegler-Natta catalysts when used for catalytic ethylene copolymerization with alpha olefins. This fact is often demonstrated by measuring the composition distribution breadth index (CDBI$_{50}$) for corresponding ethylene copolymers. The composition distribution of a polymer can be characterized by the short chain distribution index (SCDI) or composition distribution breadth index (CDBI$_{50}$). The definition of composition distribution breadth index (CDBI$_{50}$) can be found in PCT publication WO 93/03093 and U.S. Pat. No. 5,206,075. The CDBI$_{50}$ is conveniently determined using techniques which isolate polymer fractions based on their solubility (and hence their comonomer content). For example, temperature rising elution fractionation (TREF) as described by Wild et al. J. Poly. Sci., Poly. Phys. Ed. Vol. 20, p441, 1982 or in U.S. Pat. No. 4,798,081 can be employed. From the weight fraction versus composition distribution curve, the CDBI$_{50}$ is determined by establishing the weight percentage of a copolymer sample that has a comonomer content within 50% of the median comonomer content on each side of the median. Generally, Ziegler-Natta catalysts produce ethylene copolymers with a CDBI$_{50}$ of less than about 50 weight %, or less than about 55 weight %, consistent with a heterogeneously branched copolymer. In contrast, metallocenes and other single site catalysts will most often produce ethylene copolymers having a CDBI$_{50}$ of greater than about 55 weight %, or greater than about 60 weight %, consistent with a homogeneously branched copolymer.

The First Ethylene Copolymer

In an embodiment of the invention, the first ethylene copolymer of the polyethylene composition has a density of from about 0.920 g/cm$^3$ to about 0.955 g/cm$^3$; a melt index, I$_2$, of less than about 0.4 g/10 min; a molecular weight distribution, M$_w$/M$_n$, of below about 3.0 and a weight average molecular weight, M$_w$, that is greater than the M$_w$ of the second ethylene copolymer. In an embodiment of the invention, the weight average molecular weight, M$_w$, of the first ethylene copolymer is at least 110,000.

In an embodiment of the invention, the first ethylene copolymer of the polyethylene composition has a density of from about 0.920 g/cm$^3$ to about 0.955 g/cm$^3$; a melt index, I$_2$, of less than about 0.4 g/10 min; a molecular weight distribution, M$_w$/M$_n$, of below about 2.7 and a weight average molecular weight, M$_w$, that is greater than the M$_w$ of the second ethylene copolymer.

In an embodiment of the invention, the first ethylene copolymer is a homogeneously branched copolymer.

In an embodiment of the invention, the first ethylene copolymer is made with a single site catalyst, such as for example a phosphinimine catalyst.

In a embodiment of the invention, the comonomer (i.e. alpha-olefin) content in the first ethylene copolymer can be from about 0.05 to about 3.0 mol %. The comonomer content of the first ethylene polymer is determined by mathematical deconvolution methods applied to a bimodal polyethylene composition (see the Examples section).

In embodiments of the invention, the comonomer in the first ethylene copolymer is one or more olefin such as but not limited to 1-butene, 1-hexene, 1-octene and the like.

In an embodiment of the invention, the first ethylene copolymer is a copolymer of ethylene and 1-octene.

In an embodiment of the invention, the short chain branching in the first ethylene copolymer can be from about 0.25 to about 15 short chain branches per thousand carbon atoms (SCB1/1000 Cs). In further embodiments of the invention, the short chain branching in the first ethylene copolymer can be from 0.5 to 15, or from 0.5 to 12, or from 0.5 to 10, or from 0.75 to 15, or from 0.75 to 12, or from 0.75 to 10, or from 1.0 to 10, or from 1.0 to 8.0, or from 1.0 to 5, or from 1.0 to 3 branches per thousand carbon atoms (SCB1/11000 Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The number of short chain branches in the first ethylene copolymer is determined by mathematical deconvolution methods applied to a bimodal polyethylene composition (see the Examples section).

In an embodiment of the invention, the comonomer content in the first ethylene copolymer is substantially similar or approximately equal (e.g., within about ±0.01 mol %) to the comonomer content of the second ethylene copolymer (as reported, for example, in mol %).

In an embodiment of the invention, the comonomer content in the first ethylene copolymer is greater than comonomer content of the second ethylene copolymer (as reported for example in mol %).

In an embodiment of the invention, the amount of short chain branching in the first ethylene copolymer is substantially similar or approximately equal (e.g., within about ±0.05 SCB/1000 Cs) to the amount of short chain branching in the second ethylene copolymer (as reported in short chain branches, SCB per thousand carbons in the polymer backbone, 1000 Cs).

In an embodiment of the invention, the amount of short chain branching in the first ethylene copolymer is greater than the amount of short chain branching in the second ethylene copolymer (as reported in short chain branches, SCB per thousand carbons in the polymer backbone, 1000 Cs).

In an embodiment of the invention, the melt index, I$_2$ of the first ethylene copolymer is less than 0.4 g/10 min. The melt index of the first ethylene copolymer can in an embodiment of the invention be above 0.01, but below 0.4 g/10 min. In further embodiments of the invention, the melt index, I$_2$ of the first ethylene copolymer will be from 0.01 to 0.40 g/10 min, or from 0.01 to 0.30 g/10 min, or from 0.01 to 0.25 g/10 min, or from 0.01 to 0.20 g/10 min, or from 0.01 to 0.10 g/10 min.

In an embodiment of the invention, the first ethylene copolymer has a weight average molecular weight M$_w$ of from about 110,000 to about 300,000 (g/mol). In another embodiment of the invention, the first ethylene copolymer has a weight average molecular weight M$_w$ of from about 110,000 to about 275,000 or from about 110,000 to about 250,000. In another embodiment of the invention, the first ethylene copolymer has a weight average molecular weight M$_w$ of greater than about 110,000 to less than about 250,000. In further embodiments of the invention, the first ethylene copolymer has a weight average molecular weight M$_w$ of from about 125,000 to about 225,000, or from about 135,000 to about 200,000. In embodiments of the invention, the first ethylene copolymer has a weight average molecular weight M$_w$ of from about 125,000 to about 275,000, or from about 125,000 to about 250,000, or from about 150,000 to about 275,000, or from about 150,000 to about 250,000, or from about 175,000 to about 250,000. In embodiments of the invention, the first ethylene copolymer has a M$_w$ of greater than 110,000, or greater than 125,000, or greater than 150,000, or greater than 175,000. In embodiments of the invention the first ethylene copolymer has a M$_w$ of greater than 110,000, or greater than 125,000, or greater than 150,000, or greater than 175,000 while at the same time being lower than 275,000, or 250,000.

In embodiments of the invention, the density of the first ethylene copolymer is from 0.920 to 0.955 g/cm$^3$ or can be a narrower range within this range. For example, in further embodiments of the invention, the density of the first ethylene copolymer can be from 0.925 to 0.955 g/cm$^3$, or from 0.925 to 0.950 g/cm$^3$, or from 0.925 to 0.945 g/cm$^3$, or from 0.925 to 0.940 g/cm$^3$, or from 0.925 to 0.935 g/cm$^3$, or from 0.923 to 0.945 g/cm$^3$, or from 0.923 to 0.940 g/cm$^3$, or from 0.923 to 0.935 g/cm$^3$, or from 0.927 to 0.945 g/cm$^3$, or from 0.927 to 0.940 g/cm$^3$, or from 0.927 to 0.935 g/cm$^3$.

In an embodiments of the invention, the first ethylene copolymer has a molecular weight distribution $M_w/M_n$ of <3.0, or ≤2.7, or <2.7, or ≤2.5, or <2.5, or ≤2.3, or from 1.8 to 2.3.

The $M_w/M_n$ value of the first ethylene copolymer can in an embodiment of the invention be estimated by a decovolution of a GPC profile obtained for a bimodal polyethylene composition of which the first ethylene copolymer is a component.

The density and the melt index, $I_2$, of the first ethylene copolymer can be estimated from GPC (gel permeation chromatography) and GPC-FTIR (gel permeation chromatography with Fourier transform infra-red detection) experiments and deconvolutions carried out on the bimodal polyethylene composition (see the Examples section).

In an embodiment of the invention, the first ethylene copolymer of the polyethylene composition is a homogeneously branched ethylene copolymer having a weight average molecular weight, Mw, of at least 110,000; a molecular weight distribution, $M_w/M_n$, of less than 2.7 and a density of from 0.920 to 0.948 g/cm$^3$.

In an embodiment of the present invention, the first ethylene copolymer is homogeneously branched ethylene copolymer and has a CDBI$_{50}$ of greater than about 50%, or greater than about 55% by weight. In further embodiments of the invention, the first ethylene copolymer has a CDBI of greater than about 60%, or greater than about 65%, or greater than about 70%, or greater than about 75%, or greater than about 80% by weight.

In an embodiment of the invention, the first ethylene copolymer can comprise from 10 to 70 weight percent (wt %) of the total weight of the first and second ethylene copolymers. In an embodiment of the invention, the first ethylene copolymer comprises from 20 to 60 weight percent (wt %) of the total weight of the first and second ethylene copolymers. In an embodiment of the invention, the first ethylene copolymer comprises from 30 to 60 weight percent (wt %) of the total weight of the first and second ethylene copolymers. In an embodiment of the invention, the first ethylene copolymer comprises from 40 to 50 weight percent (wt %) of the total weight of the first and second ethylene copolymers.

The Second Ethylene Copolymer

In an embodiment of the invention, the second ethylene copolymer of the polyethylene composition has a density below 0.967 g/cm$^3$ but which is higher than the density of the first ethylene copolymer; a melt index, $I_2$, of from about 100 to 10,000 g/10 min; a molecular weight distribution, $M_w/M_n$, of below about 3.0 and a weight average molecular weight $M_w$ that is less than the $M_w$ of the first ethylene copolymer. In an embodiment of the invention, the weight average molecular weight, $M_w$ of the second ethylene copolymer will be below 45,000.

In an embodiment of the invention, the second ethylene copolymer of the polyethylene composition has a density below 0.967 g/cm$^3$ but which is higher than the density of the first ethylene copolymer; a melt index, $I_2$, of from about 500 to about 20,000 g/10 min; a molecular weight distribution, $M_w/M_n$, of below about 2.7, and a weight average molecular weight $M_w$ that is less than the $M_w$ of the first ethylene copolymer.

In an embodiment of the invention, the second ethylene copolymer is homogeneously branched copolymer.

In an embodiment of the invention, the second ethylene copolymer is made with a single site catalyst, such as for example a phosphinimine catalyst.

In an embodiment of the invention, the comonomer content in the second ethylene copolymer can be from about 0.05 to about 3 mol % as measured by $^{13}$C NMR, or FTIR or GPC-FTIR methods. The comonomer content of the second ethylene polymer can also be determined by mathematical deconvolution methods applied to a bimodal polyethylene composition (see the Examples section).

In an embodiment of the invention, the comonomer content in the second ethylene copolymer can be from about 0.01 to about 3 mol %, or from about 0.03 to about 3 mol % as measured by $^{13}$C NMR, or FTIR or GPC-FTIR methods. The comonomer content of the second ethylene polymer can also be determined by mathematical deconvolution methods applied to a bimodal polyethylene composition (see the Examples section).

In an embodiment of the invention, the comonomer in the second ethylene copolymer is one or more alpha olefin such as but not limited to 1-butene, 1-hexene, 1-octene and the like.

In an embodiment of the invention, the second ethylene copolymer is a copolymer of ethylene and 1-octene.

In an embodiment of the invention, the short chain branching in the second ethylene copolymer can be from about 0.25 to about 15 short chain branches per thousand carbon atoms (SCB2/1000 Cs). In further embodiments of the invention, the short chain branching in the second ethylene copolymer can be from 0.25 to 12, or from 0.25 to 8, or from 0.25 to 5, or from 0.25 to 3, or from 0.25 to 2 branches per thousand carbon atoms (SCB2/1000 Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The number of short chain branches in the second ethylene copolymer can be measured by $^{13}$C NMR, or FTIR or GPC-FTIR methods. Alternatively, the number of short chain branches in the second ethylene copolymer can be determined by mathematical deconvolution methods applied to a bimodal polyethylene composition (see the Examples section). The comonomer is one or more suitable alpha olefin such as but not limited to 1-butene, 1-hexene, 1-octene and the like, with 1-octene being preferred.

In an embodiment of the invention, the short chain branching in the second ethylene copolymer can be from about 0.05 to about 12 short chain branches per thousand carbon atoms (SCB1/1000 Cs). In further embodiments of the invention, the short chain branching in the second ethylene copolymer can be from 0.05 to 7.5, or from 0.05 to 5.0, or from 0.05 to 2.5, or from 0.05 to 1.5, or from 0.1 to 12, or from 0.1 to 10, or from 0.1 to 7.5, or from 0.1 to 5.0, or from 0.1 to 2.5, or from 0.1 to 2.0, or from 0.1 to 1.0 branches per thousand carbon atoms (SCB1/1000 Cs).

In an embodiment of the invention, the comonomer content in the second ethylene copolymer is substantially similar or approximately equal (e.g., within about ±0.01 mol %) to the comonomer content of the first ethylene copolymer (as reported, for example, in mol %).

In an embodiment of the invention, the comonomer content in the second ethylene copolymer is less than the comonomer content of the first ethylene copolymer (as reported for example in mol %).

In an embodiment of the invention, the amount of short chain branching in the second ethylene copolymer is substantially similar or approximately equal (e.g. within about ±0.05 SCB/1000 C) to the amount of short chain branching in the first ethylene copolymer (as reported in short chain branches, SCB per thousand carbons in the polymer backbone, 1000 Cs).

In an embodiment of the invention, the amount of short chain branching in the second ethylene copolymer is less than the amount of short chain branching in the first ethylene copolymer (as reported in short chain branches, SCB per thousand carbons in the polymer backbone, 1000 Cs).

In an embodiment of the present invention, the density of the second ethylene copolymer is less than 0.967 g/cm³. The density of the second ethylene copolymer in another embodiment of the invention is less than 0.966 g/cm³. In another embodiment of the invention, the density of the second ethylene copolymer is less than 0.965 g/cm³. In another embodiment of the invention, the density of the second ethylene copolymer is less than 0.964 g/cm³. In another embodiment of the invention, the density of the second ethylene copolymer is less than 0.963 g/cm³. In another embodiment of the invention, the density of the second ethylene copolymer is less than 0.962 g/cm³.

In an embodiment of the present invention, the density of the second ethylene copolymer is higher than the density of the first ethylene copolymer, but is less than 0.967 g/cm³. The density of the second ethylene copolymer in another embodiment of the invention is higher than the density of the first ethylene copolymer, but is less than 0.966 g/cm³. In another embodiment of the invention, the density of the second ethylene copolymer is higher than the density of the first ethylene copolymer, but is less than 0.965 g/cm³. In another embodiment of the invention, the density of the second ethylene copolymer is higher than the density of the first ethylene copolymer, but is less than 0.964 g/cm³. In another embodiment of the invention, the density of the second ethylene copolymer is higher than the density of the first ethylene copolymer, but is less than 0.963 g/cm³. In another embodiment of the invention, the density of the second ethylene copolymer is higher than the density of the first ethylene copolymer, but is less than 0.962 g/cm³.

In an embodiment of the invention, the density of the second ethylene copolymer is from 0.952 to 0.967 g/cm³ or can be a narrower range within this range. For example, the density of the second ethylene copolymer may in embodiments of the invention be from 0.952 to 0.966 g/cm³, 0.952 to 0.965 g/cm³, or from 0.952 to 0.964 g/cm³, or from 0.952 to 0.963 g/cm³, or from 0.954 to 0.963 g/cm³, or from 0.954 to 0.964 g/cm³, or from 0.956 to 0.964 g/cm³, or from 0.952 to less than 0.965 g/cm³, or from 0.954 to less than 0.965 g/cm³.

In an embodiment of the invention, the second ethylene copolymer has a weight average molecular weight $M_w$ of less than 25,000. In another embodiment of the invention, the second ethylene copolymer has a weight average molecular weight $M_w$ of from about 7,500 to about 23,000. In further embodiments of the invention, the second ethylene copolymer has a weight average molecular weight $M_w$ of from about 9,000 to about 22,000, or from about 10,000 to about 17,500, or from about 7,500 to about 17,500. In still further embodiments of the invention, the second ethylene copolymer has a weight average molecular weight $M_w$ of from about 3,500 to about 25,000, or from about 5,000 to about 20,000, or from about 7,500 to about 17,500, or from about 5,000 to about 15,000, or from about 5,000 to about 17,500, or from about 7,500 to about 15,000 or from about 7,500 to about 12,500. In further embodiments of the invention, the second ethylene copolymer has a weight average molecular weight $M_w$ of from about 9,000 to about 22,000, or from about 10,000 to about 17,500, or from about 7,500 to 17,500.

In embodiments of the invention, the second ethylene copolymer has a molecular weight distribution, $M_w/M_n$ of <3.0, or ≤2.7, or <2.7, or ≤2.5, or <2.5, or ≤2.3, or from 1.8 to 2.3.

The Mw/Mn value of the second ethylene copolymer can in an embodiment of the invention be estimated by a de-convolution of a GPC profile obtained for a bimodal polyethylene composition of which the first ethylene copolymer is a component.

In an embodiment of the invention, the melt index $I_2$ of the second ethylene copolymer can be from 20 to 10,000 g/10 min. In another embodiment of the invention, the melt index $I_2$ of the second ethylene copolymer can be from 100 to 10,000 g/10 min. In yet another embodiment of the invention, the melt index $I_2$ of the second ethylene copolymer can be from 1000 to 7000 g/10 min. In yet another embodiment of the invention, the melt index $I_2$ of the second ethylene copolymer can be from 1200 to 10,000 g/10 min. In yet another embodiment of the invention, the melt index $I_2$ of the second ethylene copolymer can be from 1500 to 10,000 g/10 min. In yet another embodiment of the invention, the melt index $I_2$ of the second ethylene copolymer can be greater than 1500, but less than 7000 g/10 min.

In an embodiment of the invention, the melt index $I_2$ of the second ethylene copolymer can be from 250 to 20,000 g/10 min. In another embodiment of the invention, the melt index $I_2$ of the second ethylene copolymer can be from 500 to 20,000 g/10 min. In another embodiment of the invention, the melt index $I_2$ of the second ethylene copolymer can be from greater than 750 to 20,000 g/10 min. In further embodiments of the invention, the melt index $I_2$ of the second ethylene copolymer can be from 1000 to 20,000 g/10 min, or from 1,500 to 20,000 g/10 min, or from 250 to 15,000 g/10 min, or from 250 to 10,000 g/10 min or from 500 to 17,500 g/10 min, or from 500 to 15,000 g/10 min, or from 1,500 to 15,000 g/10 min. In yet another embodiment of the invention, the melt index $I_2$ of the second ethylene copolymer can be from 1200 to 10,000 g/10 min. In yet another embodiment of the invention, the melt index $I_2$ of the second ethylene copolymer can be from 1500 to 10,000 g/10 min. In yet another embodiment of the invention, the melt index $I_2$ of the second ethylene copolymer can be greater than 1500, but less than 7000 g/10 min.

In an embodiment of the invention, the melt index $I_2$ of the second ethylene copolymer is greater than 200 g/10 min. In an embodiment of the invention, the melt index $I_2$ of the second ethylene copolymer is greater than 250 g/10 min. In an embodiment of the invention, the melt index $I_2$ of the second ethylene copolymer is greater than 500 g/10 min. In an embodiment of the invention, the melt index $I_2$ of the second ethylene copolymer is greater than 650 g/10 min. In an embodiment of the invention, the melt index $I_2$ of the second ethylene copolymer is greater than 1000 g/10 min. In an embodiment of the invention, the melt index $I_2$ of the second ethylene copolymer is greater than 1200 g/10 min. In an embodiment of the invention, the melt index $I_2$ of the second ethylene copolymer is greater than 1500 g/10 min. In an embodiment of the invention, the melt index $I_2$ of the second ethylene copolymer is greater than 1750 g/10 min.

The density and the melt index, $I_2$, of the second ethylene copolymer can be estimated from GPC and GPC-FTIR experiments and deconvolutions carried out on a bimodal polyethylene composition (see the below Examples section).

In an embodiment of the invention, the second ethylene copolymer of the polyethylene composition is a homogeneous ethylene copolymer having a weight average molecular weight, Mw, of at most 45000; a molecular weight distribution, $M_w/M_n$, of less than 2.7 and a density higher than the density of said first ethylene copolymer, but less than 0.967 g/cm$^3$.

In an embodiment of the present invention, the second ethylene copolymer is homogeneously branched ethylene copolymer and has a CDBI$_{50}$ of greater than about 50 weight %, or of greater than about 55 weight %. In further embodiments of the invention, the second ethylene copolymer has a CDBI$_{50}$ of greater than about 60 weight %, or greater than about 65 weight %, or greater than about 70 weight %, or greater than about 75 weight %, or greater than about 80 weight %.

In an embodiment of the invention, the second ethylene copolymer can comprise from 90 to 30 weight % (wt %) of the total weight of the first and second ethylene copolymers. In an embodiment of the invention, the second ethylene copolymer comprises from 80 to 40 wt % of the total weight of the first and second ethylene copolymers. In an embodiment of the invention, the second ethylene copolymer comprises from 70 to 40 wt % of the total weight of the first and second ethylene copolymers. In an embodiment of the invention, the second ethylene copolymer comprises from 60 to 50 wt % of the total weight of the first and second ethylene copolymers.

In the present invention, the second ethylene copolymer has a density which is higher than the density of the first ethylene copolymer, but less than about 0.037 g/cm$^3$ higher than the density of the first ethylene copolymer. In an embodiment of the invention, the second ethylene copolymer has a density which is higher than the density of the first ethylene copolymer, but less than about 0.036 g/cm$^3$ higher than the density of the first ethylene copolymer. In an embodiment of the invention, the second ethylene copolymer has a density which is higher than the density of the first ethylene copolymer, but less than about 0.035 g/cm$^3$ higher than the density of the first ethylene copolymer. In an embodiment of the invention, the second ethylene copolymer has a density which is higher than the density of the first ethylene copolymer, but less than about 0.034 g/cm$^3$ higher than the density of the first ethylene copolymer. In an embodiment of the invention, the second ethylene copolymer has a density which is higher than the density of the first ethylene copolymer, but less than about 0.033 g/cm$^3$ higher than the density of the first ethylene copolymer. In an embodiment of the invention, the second ethylene copolymer has a density which is higher than the density of the first ethylene copolymer, but less than about 0.032 g/cm$^3$ higher than the density of the first ethylene copolymer. In another embodiment of the invention, the second ethylene copolymer has a density which is higher than the density of the first ethylene copolymer, but less than about 0.031 g/cm$^3$ higher than the density of the first ethylene copolymer. In still another embodiment of the invention, the second ethylene copolymer has a density which is higher than the density of the first ethylene copolymer, but less than about 0.030 g/cm$^3$ higher than the density of the first ethylene copolymer.

In embodiments of the invention, the $I_2$ of the second ethylene copolymer is at least 100 times, or at least 1000 times, or at least 10,000, or at least 50,000 times the $I_2$ of the first ethylene copolymer.

The Polyethylene Composition

The polyethylene composition of this invention has a broad, bimodal or multimodal molecular weight distribution. Minimally, the polyethylene composition will contain a first ethylene copolymer and a second ethylene copolymer (as defined above) which are of different weight average molecular weight ($M_w$) and/or melt index, $I_2$.

In the present invention, the polyethylene composition will minimally comprise a first ethylene copolymer and a second ethylene copolymer (as defined above) and the ratio (SCB1/SCB2) of the number of short chain branches per thousand carbon atoms in the first ethylene copolymer (i.e., SCB1) to the number of short chain branches per thousand carbon atoms in the second ethylene copolymer (i.e., SCB2) will be greater than 0.5 (i.e., SCB1/SCB2>0.5).

In an embodiment of the invention, the ratio of the short chain branching in the first ethylene copolymer (SCB1) to the short chain branching in the second ethylene copolymer (SCB2) is at least 0.60. In an embodiment of the invention, the ratio of the short chain branching in the first ethylene copolymer (SCB1) to the short chain branching in the second ethylene copolymer (SCB2) is at least 0.75. In another embodiment of the invention, the ratio of the short chain branching in the first ethylene copolymer (SCB1) to the short chain branching in the second ethylene copolymer (SCB2) is at least 1.0. In another embodiment of the invention, the ratio of the short chain branching in the first ethylene copolymer (SCB1) to the short chain branching in the second ethylene copolymer (SCB2) is at greater than 1.0. In yet another embodiment of the invention, the ratio of the short chain branching in the first ethylene copolymer (SCB1) to the short chain branching in the second ethylene copolymer (SCB2) is at least 1.25. In still further embodiments of the invention, the ratio of the short chain branching in the first ethylene copolymer (SCB1) to the short chain branching in the second ethylene copolymer (SCB2) is at least 1.5, or at least 2.0, or at least 2.5, or at least 3.0, or at least 3.5, or at least 4.0 or at least 4.5.

In an embodiment of the invention, the ratio of the short chain branching in the first ethylene copolymer (SCB1) to the short chain branching in the second ethylene copolymer (SCB2) will be greater than 0.5, but less than 1.0.

In embodiments of the invention, the ratio (SCB1/SCB2) of the short chain branching in the first ethylene copolymer (SCB1) to the short chain branching in the second ethylene copolymer (SCB2) will be from 1.0 to 12.0, or from 1.0 to 10, or from 1.0 to 7.0, or from 1.0 to 5.0, or from 1.0 to 3.0.

In embodiments of the invention, the ratio (SCB1/SCB2) of the short chain branching in the first ethylene copolymer (SCB1) to the short chain branching in the second ethylene copolymer (SCB2) will be from 1.0 to 15.0, or from 2.0 to 12.0, or from 2.5 to 12.0, or from 3.0 to 12.0, or from 3.5 to 12.0.

In an embodiment of the invention, the polyethylene composition has a bimodal molecular weight distribution. In the current invention, the term "bimodal" means that the polyethylene composition comprises at least two components, one of which has a lower weight average molecular weight and a higher density and another of which has a higher weight average molecular weight and a lower density. Typically, a bimodal or multimodal polyethylene composition can be identified by using gel permeation chromatography (GPC). Generally, the GPC chromatograph will exhibit two or more component ethylene copolymers, where the number of component ethylene copolymers corresponds to the number of discernible peaks. One or more component ethylene copolymers may also exist as a hump, shoulder or tail relative to the molecular weight distribution of the other ethylene copolymer component.

In an embodiment of the invention, the polyethylene composition has a density of greater than or equal to 0.949 g/cm³, as measured according to ASTM D792; a melt index, $I_2$, of from about 0.4 to about 5.0 g/10 min, as measured according to ASTM 01238 (when conducted at 190° C., using a 2.16 kg weight); a molecular weight distribution, $M_w/M_n$, of from about 3 to about 11, a Z-average molecular weight, $M_z$ of less than 400,000, a stress exponent of less than 1.50 and an ESCR Condition B at 10% of at least 20 hours.

In an embodiment of the invention, the polyethylene composition of the current invention has a density of greater than or equal to 0.949 g/cm³, as measured according to ASTM D792; a melt index, $I_2$, of from about 0.2 to about 5.0 g/10 min, as measured according to ASTM 01238 (when conducted at 190° C., using a 2.16 kg weight); a molecular weight distribution, $M_w/M_n$, of from about 6 to about 13, a Z-average molecular weight, $M_z$ of less than 450,000, a stress exponent of less than 1.50 and an ESCR Condition B at 10% of at least 200 hours.

In embodiments of the invention, the polyethylene composition has a comonomer content of less than 0.75 mol %, or less than 0.70 mol %, or less than 0.65 mol %, or less than 0.60 mol %, or less than 0.55 mol % as measured by FTIR or $^{13}C$ NMR methods, with $^{13}C$ NMR being preferred, where the comonomer is one or more suitable alpha olefins such as but not limited to 1-butene, 1-hexene, 1-octene and the like. In an embodiment of the invention, the polyethylene composition has a comonomer content of from 0.1 to 0.75 mol %, or from 0.20 to 0.55 mol %, or from 0.25 to 0.50 mol %.

In the present invention, the polyethylene composition has a density of at least 0.949 g/cm³. In further embodiments of the invention, the polyethylene composition has a density of >0.949 g/cm³, or ≥0.950 g/cm³, or >0.950 g/cm³.

In an embodiment of the current invention, the polyethylene composition has a density in the range of from 0.949 to 0.960 g/cm³.

In an embodiment of the current invention, the polyethylene composition has a density in the range of from 0.949 to 0.959 g/cm³.

In an embodiment of the current invention, the polyethylene composition has a density in the range of from 0.949 to 0.957 g/cm³.

In an embodiment of the current invention, the polyethylene composition has a density in the range of from 0.949 to 0.956 g/cm³.

In an embodiment of the current invention, the polyethylene composition has a density in the range of from 0.949 to 0.955 g/cm³.

In an embodiment of the current invention, the polyethylene composition has a density in the range of from 0.950 to 0.955 g/cm³.

In an embodiment of the current invention, the polyethylene composition has a density in the range of from 0.951 to 0.957 g/cm³.

In an embodiment of the current invention, the polyethylene composition has a density in the range of from 0.951 to 0.955 g/cm³.

In an embodiment of the invention, the polyethylene composition has a melt index, $I_2$, of between 0.4 and 5.0 g/10 min according to ASTM D1238 (when conducted at 190° C., using a 2.16 kg weight) and including narrower ranges within this range. For example, in further embodiments of the invention, the polyethylene composition has a melt index, $I_2$, of from 0.5 to 5.0 g/10 min, or from 0.4 to 3.5 g/10 min, or from 0.4 to 3.0 g/10 min, or from 0.4 to 2.5 g/10 min, or from 0.4 to 2.0 g/10 min, or from 0.5 to 3.5 g/10 min, or from 0.5 to 3.0 g/10 min, or from 1.0 to 3.0 g/10 min, or from about 1.0 to about 2.0 g/10 min, or from more than 0.5 to less than 2.0 g/10 min.

In an embodiment of the invention, the polyethylene composition has a melt index, 12, of between 0.1 and 5.0 g/10 min according to ASTM D1238 (when conducted at 190° C., using a 2.16 kg weight) and including narrower ranges within this range. For example, in further embodiments of the invention, the polyethylene composition has a melt index, $I_2$, of from 0.2 to 5.0 g/10 min, or from 0.3 to 4.0 g/10 min, or from 0.3 to 3.5 g/10 min, or from 0.3 to 3.0 g/10 min, or from 0.2 to 3.5 g/10 min, or from 0.2 to 3.0 g/10 min, or from 0.1 to 2.5 g/10 min, or from 0.1 to 2.0 g/10 min.

In an embodiment of the invention, the polyethylene composition has a melt index $I_5$ of at least 1.0 g/10 min according to ASTM D1238 (when conducted at 190° C., using a 5 kg weight). In another embodiment of the invention, the polyethylene composition has a melt index, $I_5$, of greater than about 1.1 g/10 min, as measured according to ASTM D1238 (when conducted at 190° C., using a 5 kg weight). In still further embodiments of the invention, the polyethylene composition has a melt index $I_5$ of from about 1.0 to about 10.0 g/10 min, or from about 2.0 to about 8.0 g/10 min, or from about 1.0 to about 5.0 g/10 min, or from about 1.5 to about 6.5 g/10 min, or from about 4.0 to about 7.0 g/10 min, or from about 3.0 to about 6.5 g/10 min.

In an embodiment of the invention, the polyethylene composition has a high load melt index, $I_{21}$ of at least 25 g/10 min according to ASTM D1238 (when conducted at 190° C., using a 21 kg weight). In another embodiment of the invention, the polyethylene composition has a high load melt index, $I_{21}$, of greater than about 30 g/10 min. In yet another embodiment of the invention, the polyethylene composition has a high load melt index, $I_{21}$, of greater than about 35 g/10 min. In still another embodiment of the invention, the polyethylene composition has a high load melt index, $I_{21}$, of greater than about 40 g/10 min. In still another embodiment of the invention, the polyethylene composition has a high load melt index, $I_{21}$, of greater than about 50 g/10 min. In still another embodiment of the invention, the polyethylene composition has a high load melt index, $I_{21}$, of greater than about 60 g/10 min. In still another embodiment of the invention, the polyethylene composition has a high load melt index, $I_{21}$, of greater than about 75 g/10 min.

In an embodiment of the invention, the ratio of the melt index, $I_2$, of the second ethylene copolymer to the melt index, $I_5$, of the polyethylene composition is from 200 to 1500. In another embodiment of the invention, the ratio of the melt index, $I_2$, of the second ethylene copolymer to the melt index, $I_5$, of the polyethylene composition is from 400 to 1300. In yet another embodiment of the invention, the ratio of the melt index, $I_2$, of the second ethylene copolymer to the melt index, $I_5$, of the polyethylene composition is from 600 to 1200.

In an embodiment of the invention, the ratio of the melt index, $I_2$, of the second ethylene copolymer to the melt index, $I_5$, of the polyethylene composition is from 500 to 5000. In another embodiment of the invention, the ratio of the melt index, $I_2$, of the second ethylene copolymer to the melt index, $I_5$, of the polyethylene composition is from 750 to 4500. In yet another embodiment of the invention, the ratio of the melt index, $I_2$, of the second ethylene copolymer to the melt index, $I_5$, of the polyethylene composition is from 1000 to 4000.

In an embodiment of the invention, the polyethylene composition has a complex viscosity, $\eta^*$ at a shear stress ($G^*$) anywhere between from about 1 to about 10 kPa which is between 1,000 to 25,000 Pa·s. In an embodiment of the invention, the polyethylene composition has a complex viscosity, $\eta^*$ at a shear stress ($G^*$) anywhere from about 1 to about 10 kPa which is between 1,000 and 10,000 Pa·s.

In an embodiment of the invention, the polyethylene composition has a complex viscosity, $\eta^*$ at a shear stress ($G^*$) anywhere between from about 1 to about 10 kPa which is between 1,000 and 25,000 Pa·s. In an embodiment of the invention, the polyethylene composition has a complex viscosity, $\eta^*$ at a shear stress ($G^*$) anywhere from about 1 to about 10 kPa which is between 1,000 and 10,000 Pa·s, or between 1,000 and 15,000 Pa·s, or from 3,000 to 12,500 Pa·s.

In an embodiment of the invention, the polyethylene composition has a number average molecular weight, $M_n$, of below about 30,000. In another embodiment of the invention, the polyethylene composition has a number average molecular weight, $M_n$, of below about 20,000 or below about 17,500. In further embodiments of the invention, the polyethylene composition has a number average molecular weight, $M_n$, of from about 5,000 to 25,000, or from about 5,000 to 20,000, or from about 7,000 to about 15,000.

In embodiments of the invention, the polyethylene composition has a weight average molecular weight, $M_w$, of from about 60,000 to about 200,000 including narrower ranges within this range and the numbers within this range. For example, in further embodiments of the invention, the polyethylene composition has a weight average molecular weight, $M_w$, of from about 65,000 to 175,000, or from about 65,000 to about 150,000, or from about 65,000 to about 140,000.

In an embodiment of the invention, the polyethylene composition has a z-average molecular weight, $M_z$, of less than 450,000.

In embodiments of the invention, the polyethylene composition has a z-average molecular weight, $M_z$, of from 250,000 to 450,000 including narrower ranges within this range and the numbers within this range. For example, in further embodiments of the invention, the polyethylene composition has a z-average molecular weight, $M_z$, of from 250,000 to 425,000, or from 275,000 to 425,000, or from 250,000 to below 450,000, or from 250,000 to 410,000.

In embodiments of the present invention, the polyethylene composition has a molecular weight distribution Mw/Mn of from 3 to 11 or a narrower range within this range. For example, in further embodiments of the invention, the polyethylene composition has a $M_w/M_n$ of from 4.0 to 10.0, or from 4.0 to 9.0 or from 5.0 to 10.0, or from 5.0 to 9.0, or from 4.5 to 10.0, or from 4.5 to 9.5, or from 4.5 to 9.0, or from 4.5 to 8.5, or from 5.0 to 8.5.

In embodiments of the present invention, the polyethylene composition has a molecular weight distribution Mw/Mn of from 6 to 13 or a narrower range within this range. For example, in further embodiments of the invention, the polyethylene composition has a $M_w/M_n$ of from 7.0 to 12.0, or from 8.0 to 12.0, or from 8.5 to 12.0, or from 9.0 to 12.0, or from 9.0, to 12.5 or from 8.5 to 12.5.

In embodiments of the invention, the polyethylene composition has a ratio of Z-average molecular weight to weight average molecular weight ($M_z/M_w$) of from 2.0 to 5.0, or from 2.25 to 4.75, or from 2.25 to 4.5, or from 2.5 to 4.25, or from 2.75 to 4.0, or from 2.75 to 3.75, or between 3.0 and 4.0.

In embodiments of the invention, the polyethylene composition has a ratio of Z-average molecular weight to weight average molecular weight ($M_z/M_w$) of less than 5.0, or less than 4.5, or less than 4.0, or less than 3.5.

In an embodiment of the invention, the polyethylene composition has a broadness factor defined as $(M_w/M_n)/(M_z/M_w)$ of at least 2.70, or at least 2.75, or at least 2.8, or at least 2.85, or at least 2.90, or at least 2.95, or at least 3.00, or at least 3.05.

In embodiments of the invention, the polyethylene composition has a melt flow ratio defined as $I_{21}/I_2$ of >40, or ≥45, or ≥50, or ≥60, or ≥65. In a further embodiment of the invention, the polyethylene composition has a melt flow ratio $I_{21}/I_2$ of from about 40 to about 100, and including narrower ranges within this range. For example, the polyethylene composition may have a melt flow ratio $I_{21}/I_2$ of from about 45 to about 90, or from about 45 to about 80, or from about 45 to about 75, or from about 45 to about 70, or from about 50 to about 90, or from about 50 to about 80, or from about 50 to about 75, or from about 50 to about 70.

In an embodiment of the invention, the polyethylene composition has a melt flow rate defined as $I_{21}/I_5$ of less than 30. In another embodiment of the invention, the polyethylene composition has a melt flow rate defined as $I_{21}/I_5$ of less than 25. In another embodiment of the invention, the polyethylene composition has a melt flow rate defined as $I_{21}/I_5$ of less than 20.

In an embodiment of the invention, the polyethylene composition has a shear viscosity at about $10^5 s^{-1}$ (240° C.) of less than about 10 (Pa·s). In further embodiments of the invention, the polyethylene composition has a shear viscosity at about $10^5 s^{-1}$ (240° C.) of less than 7.5 Pa·s, or less than 6.0 Pa·s.

In an embodiment of the invention, the polyethylene composition has a hexane extractables level of below 0.55 wt %.

In an embodiment of the invention, the polyethylene composition has at least one type of alpha-olefin that has at least 4 carbon atoms and its content is less than 0.75 mol % as determined by $^{13}C$ NMR. In an embodiment of the invention, the polyethylene composition has at least one type of alpha-olefin that has at least 4 carbon atoms and its content is less than 0.65 mol % as determined by $^{13}C$ NMR. In an embodiment of the invention, the polyethylene composition has at least one type of alpha-olefin that has at least 4 carbon atoms and its content is less than 0.55 mol % as determined by $^{13}C$ NMR.

In an embodiment of the invention, the shear viscosity ratio, $SVR_{(10,1000)}$ at 240° C. of the polyethylene composition can be from about 4.0 to 25, or from 4.0 to 20, or from 4.0 to 17. The shear viscosity ratio $SVR_{(10,1000)}$ is determined by taking the ratio of shear viscosity at shear rate of 10 $s^{-1}$ and shear viscosity at shear rate of 1000 $s^{-1}$ as measured with a capillary rheometer at constant temperature (e.g. 240° C.), and a die with L/D ratio of 20 and diameter of 0.06". Without wishing to be bound by theory, the higher the value for the shear viscosity ratio, the easier the polyethylene composition is to be processed on a converting equipment for caps and closures.

In embodiments of the invention, the polyethylene composition has a shear viscosity ratio ($\eta_{10}/\eta_{1000}$ at 240° C.) of >12.0, ≥12.5, or ≥13.0, or ≥13.5, or ≥14.0, or ≥14.5, or ≥15.0, or ≥17.5, or ≥20.0. The "shear viscosity ratio" is used herein as a means to describe the relative processability of a polyethylene composition.

In further embodiments of the invention, the shear viscosity ratio, $SVR_{(10,1000)}$ at 240° C. of the polyethylene composition is from 10.0 to 30, or from 12.0 to 30, or from 12.0 to 27.5, or from 12.0 to 25, or from 12.5 to 30, or from 12.5 to 27.5, or from 12.5 to 25.

In an embodiment of the invention, the shear thinning index, $SHI_{(1,100)}$ of the polyethylene composition is less than about 10; in another embodiment the $SHI_{(1,100)}$ will be less than about 7. The shear thinning index (SHI), was calculated using dynamic mechanical analysis (DMA) frequency sweep methods as disclosed in PCT applications WO 2006/048253 and WO 2006/048254. The SHI value is obtained by calculating the complex viscosities $\eta*(1)$ and $\eta*(100)$ at a constant shear stress of 1 kPa (G*) and 100 kPa (G*), respectively.

In an embodiment of the invention, the $SHI_{(1,100)}$ of the polyethylene composition satisfies the equation: $SHI_{(1,100)} < -10.58$ (log $I_2$ of polyethylene composition in g/10 min)/(g/10 min)+12.94. In another embodiment of the invention, the $SHI_{(1,100)}$ of the polyethylene composition satisfies the equation:

$$SHI_{(1,100)} < -5.5 (\log I_2 \text{ of the polyethlene composition in g/10 min})/(g/10 \text{ min}) + 9.66.$$

In an embodiment of the invention, the polyethylene composition or a molded article (or plaque) made from the polyethylene composition, has an environment stress crack resistance ESCR Condition B at 10% of at least 20 hours, or at least 60 hours, or at least 80 hours, or at least 120 hours, or at least 150 hours, or from 60 to 400 hours, or from 100 to 250 hours, or from 60 to 250 hours as measured according to ASTM D1693 (at 10% Igepal and 50° C. under condition B).

In an embodiment of the invention, the polyethylene composition or a molded article (or plaque) made from the polyethylene composition, has an environment stress crack resistance ESCR Condition B at 10% of at least 200 hours, as measured according to ASTM D1693 (at 10% Igepal and 50° C. under condition B).

In an embodiment of the invention, the polyethylene composition or a molded article (or plaque) made from the polyethylene composition, has an environment stress crack resistance ESCR Condition B at 10% of at least 250 hours, as measured according to ASTM D1693 (at 10% Igepal and 50° C. under condition B).

In an embodiment of the invention, the polyethylene composition or a molded article (or plaque) made from the polyethylene composition, has an environment stress crack resistance ESCR Condition B at 10% of at least 300 hours, as measured according to ASTM D1693 (at 10% Igepal and 50° C. under condition B).

In an embodiment of the invention, the polyethylene composition or a molded article (or plaque) made from the polyethylene composition, has an environment stress crack resistance ESCR Condition B at 10% of at least 350 hours, as measured according to ASTM D1693 (at 10% Igepal and 50° C. under condition B).

In an embodiment of the invention, the polyethylene composition or a molded article (or plaque) made from the polyethylene composition, has an environment stress crack resistance ESCR Condition B at 10% of at least 400 hours, as measured according to ASTM D1693 (at 10% Igepal and 50° C. under condition B).

In an embodiment of the invention, the polyethylene composition or a molded article (or plaque) made from the polyethylene composition, has an environment stress crack resistance ESCR Condition B at 10% of at least 500 hours, as measured according to ASTM D1693 (at 10% Igepal and 50° C. under condition B).

In an embodiment of the invention, the polyethylene composition or a molded article (or plaque) made from the polyethylene composition, has an environment stress crack resistance ESCR Condition B at 10% of from 200 to 1500 hours, as measured according to ASTM D1693 (at 10% Igepal and 50° C. under condition B).

In an embodiment of the invention, the polyethylene composition or a molded article (or plaque) made from the polyethylene composition, has an environment stress crack resistance ESCR Condition B at 10% of from 200 to 1250 hours, as measured according to ASTM D1693 (at 10% Igepal and 50° C. under condition B).

In an embodiment of the invention, the polyethylene composition or a molded article (or plaque) made from the polyethylene composition, has an environment stress crack resistance ESCR Condition B at 10% of from 300 to 1500 hours, as measured according to ASTM D1693 (at 10% Igepal and 50° C. under condition B).

In an embodiment of the invention, the polyethylene composition or a molded article (or plaque) made from the polyethylene composition has a notched Izod impact strength of at least 60 J/m, or at least 70 J/m, or at least 80 J/m, or at least 90 J/m, or at least 100 J/m as measured according to ASTM D256.

In an embodiment of the invention the polyethylene composition of the current invention has a density of from 0.949 to 0.956 g/cm³; a melt index, I2, of from 0.5 to 3.0 g/10 min; a molecular weight distribution of from 4.0 to 10.0; a number average molecular weight, $M_n$, of below 30,000; a shear viscosity at $10^5 s^{-1}$ (240° C.) of less than 10 (Pa·s), a hexane extractables of less than 0.55%, a notched Izod impact strength of more than 60 J/m, and an ESCR B at 10% of at least 20 hours.

In an embodiment of the invention the polyethylene composition of the current invention has a density of from 0.949 to 0.956 g/cm³; a melt index, I2, of from 0.5 to 3.0 g/10 min; a molecular weight distribution of from 4.5 to 9.5; a number average molecular weight, $M_n$, of below 30,000; a shear viscosity at $10^5 s^{-1}$ (240° C.) of less than 7 (Pa·s), a hexane extractables of less than 0.55%, a notched Izod impact strength of more than 60 J/m and an ESCR B at 10% of at least 80 hours.

In an embodiment of the invention the polyethylene composition of the current invention has a density of from 0.949 to 0.956 g/cm³; a melt index, $I_2$, of from 0.2 to 3.0 g/10 min; a molecular weight distribution of from 6.0 to 13.0; a number average molecular weight, $M_n$, of below 30,000; a shear viscosity at $10^5 s^{-1}$ (240° C.) of less than 10 (Pa·s), a hexane extractables of less than 0.55%, a notched Izod impact strength of more than 60 J/m, and an ESCR B at 10% of at least 200 hours.

In embodiments of the invention, the polyethylene composition has a 2% secant flexural modulus in megapascals (MPa) of greater than about 750, or greater than about 850, or greater than about 1000, or from about 750 to about 1600, or from about 750 to about 1250, or from about 850 to about 1150. In some embodiments the polyethylene composition further comprises a nucleating agent which increases the 2% secant flexural modulus in megapascals (MPa) to above these ranges to for example from more than about 1000 and up to about 1600. Without wishing to be bound by theory, the 2% secant flexural modulus is a measure of polymer stiffness. The higher the 2% secant flexural modulus, the higher the polymer stiffness.

In an embodiment of the invention the polyethylene composition of the current invention has a density of from 0.949 to 0.956 g/cm$^3$; a melt index, I2, of from 0.2 to 3.0 g/10 min; a molecular weight distribution of from 7.0 to 12.0; a number average molecular weight, $M_n$, of below 30,000; a shear viscosity at $10^5 s^{-1}$ (240° C.) of less than 7 (Pa·s), a hexane extractables of less than 0.55%, a notched Izod impact strength of more than 60 J/m and an ESCR B at 10% of at least 200 hours.

In an embodiment of the invention, the polyethylene composition has a stress exponent, defined as $Log_{10}[I_6/I_2]/Log_{10}[6.48/2.16]$, which is ≤1.50. In further embodiments of the invention the polyethylene composition has a stress exponent, $Log_{10}[I_6/I_2]/Log_{10}[6.48/2.16]$ of less than 1.50, or less than 1.48, or less than 1.45, or less than 1.43, or less than 1.40.

In an embodiment of the invention, the polyethylene composition has a composition distribution breadth index (CDBI$_{50}$), as determined by temperature elution fractionation (TREF), of 60 weight %. In further embodiments of the invention, the polyethylene composition will have a CDBI$_{50}$ of greater than 65 weight %, or greater than 70 weight %, or greater than 75 weight %, or greater than 80 weight %.

In an embodiment of the invention, the polyethylene composition has a composition distribution breadth index (CDBI$_{25}$), as determined by temperature elution fractionation (TREF), of 50 weight %. In further embodiments of the invention, the polyethylene composition will have a CDBI$_{25}$ of greater than 55 weight %, or greater than 60 weight %, or greater than 65 weight %, or greater than 70 weight %.

The polyethylene composition of this invention can be made using any conventional blending method such as but not limited to physical blending and in-situ blending by polymerization in multi reactor systems. For example, it is possible to perform the mixing of the first ethylene copolymer with the second ethylene copolymer by molten mixing of the two preformed polymers. Preferred are processes in which the first and second ethylene copolymers are prepared in at least two sequential polymerization stages, however, both in-series and in-parallel reactor process are contemplated for use in the current invention. If the at least two reactors are configured in parallel, comonomer addition to each reactor makes an ethylene copolymer in each reactor. If the at least two reactors are configured in series, comonomer may be added to at least the first reactor, and unreacted comonomer can flow into later reactors to make an ethylene copolymer in each reactor. Alternatively, if the at least two reactors are configured in series, comonomer may be added to each reactor, to make an ethylene copolymer in each reactor. Gas phase, slurry phase or solution phase reactor systems may be used, with solution phase reactor systems being preferred.

In an embodiment of the current invention, a dual reactor solution process is used as has been described in for example U.S. Pat. No. 6,372,864 and U.S. Patent Publication Application No. 20060247373A1 which are incorporated herein by reference.

Homogeneously branched ethylene copolymers can be prepared using any catalyst capable of producing homogeneous branching. Generally, the catalysts will be based on a group 4 metal having at least one cyclopentadienyl ligand that is well known in the art. Examples of such catalysts which include metallocenes, constrained geometry catalysts and phosphinimine catalysts are typically used in combination with activators selected from methylaluminoxanes, boranes or ionic borate salts and are further described in U.S. Pat. Nos. 3,645,992; 5,324,800; 5,064,802; 5,055,438; 6,689,847; 6,114,481 and 6,063,879. Such catalysts may also be referred to as "single site catalysts" to distinguish them from traditional Ziegler-Natta or Phillips catalysts which are also well known in the art. In general, single site catalysts produce ethylene copolymers having a molecular weight distribution ($M_w/M_n$) of less than about 3.0 and a composition distribution breadth index (CDBI$_{50}$) of greater than about 50% by weight.

In an embodiment of the current invention, homogeneously branched ethylene polymers are prepared using an organometallic complex of a group 3, 4 or 5 metal that is further characterized as having a phosphinimine ligand. Such catalysts are known generally as phosphinimine catalysts. Some non-limiting examples of phosphinimine catalysts can be found in U.S. Pat. Nos. 6,342,463; 6,235,672; 6,372,864; 6,984,695; 6,063,879; 6,777,509 and 6,277,931 all of which are incorporated by reference herein.

Some non-limiting examples of metallocene catalysts can be found in U.S. Pat. Nos. 4,808,561; 4,701,432; 4,937,301; 5,324,800; 5,633,394; 4,935,397; 6,002,033 and 6,489,413, which are incorporated herein by reference. Some non-limiting examples of constrained geometry catalysts can be found in U.S. Pat. Nos. 5,057,475; 5,096,867; 5,064,802; 5,132,380; 5,703,187 and 6,034,021, all of which are incorporated by reference herein in their entirety.

In an embodiment of the invention, use of a single site catalyst that does not produce long chain branching (LCB) is preferred. Without wishing to be bound by any single theory, long chain branching can increase viscosity at low shear rates, thereby negatively impacting cycle times during the manufacture of caps and closures, such as during the process of compression molding. Long chain branching may be determined using $^{13}C$ NMR methods and may be quantitatively assessed using the method disclosed by Randall in Rev. Macromol. Chem. Phys. C29 (2 and 3), p. 285.

In an embodiment of the invention, the polyethylene composition will contain fewer than 0.3 long chain branches per 1000 carbon atoms. In another embodiment of the invention, the polyethylene composition will contain fewer than 0.01 long chain branches per 1000 carbon atoms.

In an embodiment of the invention, the polyethylene composition (defined as above) is prepared by contacting ethylene and at least one alpha-olefin with a polymerization catalyst under solution phase polymerization conditions in at least two polymerization reactors (for an example of solution phase polymerization conditions see, for example, U.S. Pat. Nos. 6,372,864; 6,984,695 and U.S. Patent Publication Application No. 2006/0247373A1 which are incorporated herein by reference).

In an embodiment of the invention, the polyethylene composition is prepared by contacting at least one single site polymerization catalyst system (comprising at least one single site catalyst and at least one activator) with ethylene and a least one comonomer (e.g., a C3-C8 alpha-olefin) under solution polymerization conditions in at least two polymerization reactors.

In an embodiment of the invention, a group 4 single site catalyst system, comprising a single site catalyst and an activator, is used in a solution phase dual reactor system to prepare a bimodal polyethylene composition by polymerization of ethylene in the presence of an alpha-olefin comonomer.

In an embodiment of the invention, a group 4 single site catalyst system, comprising a single site catalyst and an activator, is used in a solution phase dual reactor system to prepare a bimodal polyethylene composition by polymerization of ethylene in the presence of 1-octene.

In an embodiment of the invention, a group 4 phosphinimine catalyst system, comprising a phosphinimine catalyst and an activator, is used in a solution phase dual reactor system to prepare a bimodal polyethylene composition by polymerization of ethylene in the presence of an alpha-olefin comonomer.

In an embodiment of the invention, a group 4 phosphinimine catalyst system, comprising a phosphinimine catalyst and an activator, is used in a solution phase dual reactor system to prepare a bimodal polyethylene composition by polymerization of ethylene in the presence of 1-octene.

In an embodiment of the invention, a solution phase dual reactor system comprises two solution phase reactors connected in series.

In an embodiment of the invention, a polymerization process to prepare the polyethylene composition comprises contacting at least one single site polymerization catalyst system with ethylene and at least one alpha-olefin comonomer under solution polymerization conditions in at least two polymerization reactors.

In an embodiment of the invention, a polymerization process to prepare the polyethylene composition comprises contacting at least one single site polymerization catalyst system with ethylene and at least one alpha-olefin comonomer under solution polymerization conditions in at least a first reactor and a second reactor configured in series.

In an embodiment of the invention, a polymerization process to prepare the polyethylene composition comprises contacting at least one single site polymerization catalyst system with ethylene and at least one alpha-olefin comonomer under solution polymerization conditions in at least a first reactor and a second reactor configured in series, with the at least one alpha-olefin comonomer being fed exclusively to the first reactor.

The production of the polyethylene composition of the present invention will typically include an extrusion or compounding step. Such steps are well known in the art.

The polyethylene composition can comprise further polymer components in addition to the first and second ethylene polymers. Such polymer components include polymers made in situ or polymers added to the polymer composition during an extrusion or compounding step.

Optionally, additives can be added to the polyethylene composition. Additives can be added to the polyethylene composition during an extrusion or compounding step, but other suitable known methods will be apparent to a person skilled in the art. The additives can be added as is or as part of a separate polymer component (i.e., not the first or second ethylene polymers described above) added during an extrusion or compounding step. Suitable additives are known in the art and include but are not-limited to antioxidants, phosphites and phosphonites, nitrones, antacids, UV light stabilizers, UV absorbers, metal deactivators, dyes, fillers and reinforcing agents, nano-scale organic or inorganic materials, antistatic agents, lubricating agents such as calcium stearates, slip additives such as erucimide, and nucleating agents (including nucleators, pigments or any other chemicals which may provide a nucleating effect to the polyethylene composition). The additives that can be optionally added are typically added in amount of up to 20 weight percent (wt %).

One or more nucleating agent(s) may be introduced into the polyethylene composition by kneading a mixture of the polymer, usually in powder or pellet form, with the nucleating agent, which may be utilized alone or in the form of a concentrate containing further additives such as stabilizers, pigments, antistatics, UV stabilizers and fillers. It should be a material which is wetted or absorbed by the polymer, which is insoluble in the polymer and of melting point higher than that of the polymer, and it should be homogeneously dispersible in the polymer melt in as fine a form as possible (1 to 10 µm). Compounds known to have a nucleating capacity for polyolefins include salts of aliphatic monobasic or dibasic acids or arylalkyl acids, such as sodium succinate or aluminum phenylacetate; and alkali metal or aluminum salts of aromatic or alicyclic carboxylic acids such as sodium 3-naphthoate. Another compound known to have nucleating capacity is sodium benzoate. The effectiveness of nucleation may be monitored microscopically by observation of the degree of reduction in size of the spherulites into which the crystallites are aggregated.

Examples of nucleating agents which are commercially available and which may be added to the polyethylene composition are dibenzylidene sorbital esters (such as the products sold under the trademark Millad™ 3988 by Milliken Chemical and Irgacleamm by Ciba Specialty Chemicals). Further examples of nucleating agents which may added to the polyethylene composition include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophtalic acid structure (or "HHPA" structure) as disclosed in U.S. Pat. No. 6,599,971 (Dotson et al., to Milliken); and phosphate esters, such as those disclosed in U.S. Pat. No. 5,342,868 and those sold under the trade names NA-11 and NA-21 by Asahi Denka Kogyo, cylic dicarboxylates and the salts thereof, such as the divalent metal or metalloid salts, (particularly, calcium salts) of the HHPA structures disclosed in U.S. Pat. No. 6,599,971. For clarity, the HHPA structure generally comprises a ring structure with six carbon atoms in the ring and two carboxylic acid groups which are substituents on adjacent atoms of the ring structure. The other four carbon atoms in the ring may be substituted, as disclosed in U.S. Pat. No. 6,599,971. An example is 1,2-cyclohexanedicarboxylicacid, calcium salt (CAS registry number 491589-22-1). Still further examples of nucleating agents which may added to the polyethylene composition include those disclosed in WO2015042561, WO2015042563, WO2015042562 and WO 2011050042.

Many of the above described nucleating agents may be difficult to mix with the polyethylene composition that is being nucleated and it is known to use dispersion aids, such as for example, zinc stearate, to mitigate this problem.

In an embodiment of the invention, the nucleating agents are well dispersed in the polyethylene composition.

In an embodiment of the invention, the amount of nucleating agent used is comparatively small (from 100 to 3000 parts by million per weight (based on the weight of the polyethylene composition)) so it will be appreciated by those skilled in the art that some care must be taken to ensure that the nucleating agent is well dispersed. In an embodiment of the invention, the nucleating agent is added in finely divided form (less than 50 microns, especially less than 10 microns) to the polyethylene composition to facilitate mixing. This type of "physical blend" (i.e., a mixture of the nucleating agent and the resin in solid form) is generally preferable to the use of a "masterbatch" of the nucleator (where the term "masterbatch" refers to the practice of first melt mixing the additive—the nucleator, in this case—with a small amount of the polyethylene composition resin—then melt mixing the "masterbatch" with the remaining bulk of the polyethylene composition resin).

In an embodiment of the invention, an additive such as nucleating agent may be added to the polyethylene composition by way of a "masterbatch", where the term "masterbatch" refers to the practice of first melt mixing the additive (e.g., a nucleator) with a small amount of the polyethylene composition, followed by melt mixing the "masterbatch" with the remaining bulk of the polyethylene composition.

In an embodiment of the invention, the polymer composition further comprises a nucleating agent or a mixture of nucleating agents.

In an embodiment of the invention, the polymer compositions described above are used in the formation of molded articles. For example, articles formed by compression molding and injection molding are contemplated. Such articles include, for example, caps, screw caps, and closures for bottles. However, a person skilled in the art will readily appreciate that the compositions described above may also be used for other applications such as, but not limited to, film, injection blow molding, blow molding and sheet extrusion applications.

In an embodiment of the invention, the polyethylene compositions described above are used in the formation of a closure for bottles, containers, pouches and the like. For example, closures for bottles formed by compression molding or injection molding are contemplated. Such closures include, for example, hinged caps, hinged screw caps, hinged snap-top caps, and hinged closures for bottles, containers, pouches and the like.

In an embodiment of the invention, a closure (or cap) is a screw cap for a bottle, container, pouches and the like.

In an embodiment of the invention, a closure (or cap) is a snap closure for a bottle, container, pouches and the like.

In an embodiment of the invention, a closure (or cap) comprises a hinge made of the same material as the rest of the closure (or cap).

In an embodiment of the invention, a closure (or cap) is hinged closure.

In an embodiment of the invention, a closure (or cap) is a hinged closure for bottles, containers, pouches and the like.

In an embodiment of the invention, a closure (or cap) is a flip-top hinge closure, such as a flip-top hinge closure for use on a plastic ketchup bottle or similar containers containing foodstuffs.

When a closure is a hinged closure, it comprises a hinged component and generally consists of at least two bodies which are connected by a thinner section that acts as a hinge allowing the at least two bodies to bend from an initially molded position. The thinner section may be continuous or web-like, wide or narrow.

A useful closure (for bottles, containers and the like) is a hinged closure and may consist of two bodies joined to each other by at least one thinner bendable portion (e.g., the two bodies can be joined by a single bridging portion, or more than one bridging portion, or by a webbed portion, etc.). A first body may contain a dispensing hole and which may snap onto or screw onto a container to cover a container opening (e.g., a bottle opening) while a second body may serve as a snap on lid which may mate with the first body.

The caps and closures, of which hinged caps and closures and screw caps are a subset, can be made according to any known method, including, for example, injection molding and compression molding techniques that are well known to persons skilled in the art. Hence, in an embodiment of the invention a closure (or cap) comprising the polyethylene composition (defined above) is prepared with a process comprising at least one compression molding step and/or at least one injection molding step.

In one embodiment, the caps and closures (including single piece or multi-piece variants and hinged variants) comprise the polyethylene composition described above and have good organoleptic properties, good toughness, as well as good ESCR values. Hence, the closures and caps of this embodiment are well suited for sealing bottles, containers and the like, for example, bottles that may contain drinkable water, and other foodstuffs, including but not limited to liquids that are under an appropriate pressure (i.e., carbonated beverages or appropriately pressurized drinkable liquids).

The closures and caps may also be used for sealing bottles containing drinkable water or non-carbonated beverages (e.g., juice). Other applications, include caps and closures for bottles, containers and pouches containing foodstuffs, such as, for example, ketchup bottles and the like.

The invention is further illustrated by the following non-limiting examples.

EXAMPLES $M_n$, $M_w$, and $M_z$ (g/mol) were determined by high temperature Gel Permeation Chromatography (GPC) with differential refractive index (DRI) detection using universal calibration (e.g., ASTM-D6474-99). GPC data was obtained using an instrument sold under the trade name "Waters 150 c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). The molecular weight distribution (MWD) is the weight average molecular weight divided by the number average molecular weight, $M_w/M_n$. The z-average molecular weight distribution is $M_z/M_n$. Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

Primary melting peak (° C.), heat of fusion (J/g) and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes;

the melt was then cooled to 0° C. at a cooling rate of 10° C./min and kept at 0° C. for five minutes; the specimen was then heated to 200° C. at a heating rate of 10° C./min. The DSC Tm, heat of fusion and crystallinity are reported from the $2^{nd}$ heating cycle.

The short chain branch frequency (SCB per 1000 carbon atoms) of copolymer samples was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

Comonomer content can also be measured using $^{13}C$ NMR techniques as discussed in Randall, Rev. Macromol. Chem. Phys., C29 (2&3), p. 285; U.S. Pat. No. 5,292,845 and WO 2005/121239.

Polyethylene composition density (g/cm$^3$) was measured according to ASTM D792.

Hexane extractables were determined according to ASTM D5227.

Shear viscosity was measured by using a Kayeness WinKARS Capillary Rheometer (model # D5052M-115). For the shear viscosity at lower shear rates, a die having a die diameter of 0.06 inch and L/D ratio of 20 and an entrance angle of 180 degrees was used. For the shear viscosity at higher shear rates, a die having a die diameter of 0.012 inch and L/D ratio of 20 was used.

The Shear viscosity ratio as the term is used in the present invention is defined as: $\eta_{10}/\eta_{1000}$ at 240° C. The $\eta 10$ is the melt shear viscosity at the shear rate of 10 s$^{-1}$ and the $\eta_{1000}$ is the melt shear viscosity at the shear rate of 1000 s$^{-1}$ measured at 240° C.

Melt indexes, $I_2$, $I_5$, $I_6$ and $I_{21}$ for the polyethylene composition were measured according to ASTM D1238 (when conducted at 190° C., using a 2.16 kg, a 5 kg, a 6.48 kg and a 21 kg weight, respectively).

To determine CDBI$_{50}$, a solubility distribution curve is first generated for the polyethylene composition. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI$_{50}$ is determined by establishing the weight percentage of a copolymer sample that has a comonomer content within 50% of the median comonomer content on each side of the median (See WO 93/03093 and U.S. Pat. No. 5,376,439). The CDBI$_{25}$ is determined by establishing the weight percentage of a copolymer sample that has a comonomer content within 25% of the median comonomer content on each side of the median.

The specific temperature rising elution fractionation (TREF) method used herein was as follows. Polymer samples (50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g., 150° C.) for 1 to 3 hours. The solution (0.5 to 1.5 ml) was then loaded into the TREF column filled with stainless steel beads. After equilibration at a given stabilization temperature (e.g., 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

The melt index, $I_2$ and density of the first and second ethylene copolymers were estimated by GPC and GPC-FTIR deconvolutions as discussed further below.

High temperature GPC equipped with an online FTIR detector (GPC-FTIR) was used to measure the comonomer content as the function of molecular weight. Mathematical deconvolutions are performed to determine the relative amount of polymer, molecular weight and comonomer content of the component made in each reactor, by assuming that each polymer component follows a Flory's molecular weight distribution function and it has a homogeneous comonomer distribution across the whole molecular weight range.

For these single site catalyzed resins, the GPC data from GPC chromatographs was fit based on Flory's molecular weight distribution function.

To improve the deconvolution accuracy and consistency, as a constraint, the melt index, $I_2$, of the targeted resin was set and the following relationship was satisfied during the deconvolution:

$$\mathrm{Log}_{10}(I_2)=22.326528+0.003467*[\mathrm{Log}_{10}(M_n)]^3-4.322582*\mathrm{Log}_{10}(M_w)-0.180061*[\mathrm{Log}_{10}(M_z)]^2+0.026478*[\mathrm{Log}_{10}(M_z)]^3$$

where the experimentally measured overall melt index, $I_2$, was used on the left side of the equation, while $M_n$ of each component ($M_w=2\times M_n$ and $M_z=1.5\times M_2$ for each component) was adjusted to change the calculated overall $M_n$, $M_w$ and $M_z$ of the composition until the fitting criteria were met. During the deconvolution, the overall $M_n$, $M_w$ and $M_z$ are calculated with the following relationships: $M_n=1/\mathrm{Sum}(w_i/M_n(i))$, $M_w=\mathrm{Sum}(w_i(i))$, $M_z=\mathrm{Sum}(w_i\times M_z(i)^2)$, where i represents the i-th component and $w_i$ represents the relative weight fraction of the i-th component in the composition.

The uniform comonomer distribution (which results from the use of a single site catalyst) of the resin components (i.e., the first and second ethylene copolymers) allowed the estimation of the short chain branching content (SCB) from the GPC-FTIR data, in branches per 1000 carbon atoms and calculation of comonomer content (in mol %) and density (in g/cm$^3$) for the first and second ethylene copolymers, based on the deconvoluted relative amounts of first and second ethylene copolymer components in the polyethylene composition, and their estimated resin molecular weight parameters from the above procedure.

A component (or composition) density model and a component (or composition) melt index, $I_2$, model was used according to the following equations to calculate the density and melt index $I_2$ of the first and second ethylene polymers:

$$\mathrm{density}=0.979863-0.00594808*(\mathrm{FTIR\ SCB}/1000C)^{0.65}-0.000383133*[\mathrm{Log}_{10}(M_n)]^3 0.00000577986*(M_w/M_n)^3+0.00557395*(M_z/M_w)^{0.25};$$

$$\mathrm{Log}_{10}(\mathrm{melt\ index}, I_2)=22.326528+0.003467*[\mathrm{Log}_{10}(M_n)]^3-4.322582*\mathrm{Log}_{10}(M_w)=0.180061*[\mathrm{Log}_{10}(M_z)]^2+0.026478*[\mathrm{Log}_{10}(M_z)]^3$$

where the $M_n$, $M_w$ and $M_z$ were the deconvoluted values of the individual ethylene polymer components, as obtained from the results of the above GPC deconvolutions. Hence, these two models were used to estimate the melt indexes and the densities of the components (i.e., the first and second ethylene copolymers).

Plaques molded from the polyethylene compositions were tested according to the following ASTM methods: Bent Strip Environmental Stress Crack Resistance (ESCR) at Condition B at 10% IGEPAL at 50° C., ASTM D1693; notched Izod impact properties, ASTM D256; Flexural Properties, ASTM D 790; Tensile properties, ASTM D 638; Vicat softening point, ASTM D 1525; Heat deflection temperature, ASTM D 648.

Dynamic mechanical analyses were carried out with a rheometer, namely Rheometrics Dynamic Spectrometer (RDS-II) or Rheometrics SR5 or ATS Stresstech, on compression molded samples under nitrogen atmosphere at 190° C., using 25 mm diameter cone and plate geometry. The oscillatory shear experiments were done within the linear viscoelastic range of strain (10% strain) at frequencies from 0.05 to 100 rad/s. The values of storage modulus (G'), loss modulus (G"), complex modulus (G*) and complex viscosity ($\eta^*$) were obtained as a function of frequency. The same rheological data can also be obtained by using a 25 mm diameter parallel plate geometry at 190° C. under nitrogen atmosphere. The SHI(1,100) value is calculated according to the methods described in WO 2006/048253 and WO 2006/048254.

Examples of the polyethylene compositions were produced in a dual reactor solution polymerization process in which the contents of the first reactor flow into the second reactor. This in-series "dual reactor" process produces an "in-situ" polyethylene blend (i.e., the polyethylene composition). Note, that when an in-series reactor configuration is used, un-reacted ethylene monomer, and un-reacted alpha-olefin comonomer present in the first reactor will flow into the downstream second reactor for further polymerization.

In the present inventive examples, although no co-monomer is fed directly to the downstream second reactor, an ethylene copolymer is nevertheless formed in the second reactor due to the significant presence of un-reacted 1-octene flowing from the first reactor to the second reactor where it is copolymerized with ethylene. Each reactor is sufficiently agitated to give conditions in which components are well mixed. The volume of the first reactor was 12 liters and the volume of the second reactor was 22 liters. Optionally, a tubular reactor section which receives the discharge from the second reactor may be also be present as described in U.S. Pat. No. 8,101,693. These are the pilot plant scales. The first reactor was operated at a pressure of 10500 to 35000 kPa and the second reactor was operated at a lower pressure to facilitate continuous flow from the first reactor to the second. The solvent employed was methylpentane. The process operates using continuous feed streams. The catalyst employed in the dual reactor solution process experiments was a titanium complex having a phosphinimine ligand, a cyclopentadienide ligand and two activatable ligands, such as but not limited to chloride ligands. A boron based co-catalyst was used in approximately stoichiometric amounts relative to the titanium complex. Commercially available methylaluminoxane (MAO) was included as a scavenger at an Al:Ti of about 40:1. In addition, 2,6-di-tert-butylhydroxy-4-ethylbenzene was added to scavenge free trimethylaluminum within the MAO in a ratio of Al:OH of about 0.5:1.

The polymerization conditions used to make the inventive compositions are provided in Table 1.

Inventive and comparative polyethylene composition properties are described in Tables 2.

Calculated properties for the first ethylene copolymer and the second ethylene copolymer for selected comparative and inventive polyethylene compositions, as obtained from GPC-FTIR deconvolution studies, are provided in Table 3.

The properties of pressed plaques made from comparative and inventive polyethylene compositions are provided in Table 4.

Comparative polyethylene compositions (Comparative Examples 1-5) are made using a single site phosphinimine catalyst in a dual reactor solution process and have an ESCR at condition B10 of less than 24 hours and a SCB1/SCB2 ratio of 0.50 or less.

Comparative polyethylene composition 6 (Comparative Example 6) is a commercially available, high density, bimodal polyethylene resin from Dow Chemical, DMDA-1250 NT 7 which has an ESCR at condition B10 (at 50° C., 10% IGEPAL) of less than 200 hours, and an Mz of greater than 500,000.

Comparative polyethylene composition 7 (Comparative Example 7) is a commercially available, high density polyethylene resin from Dow Chemical, DMDA-1270 NT 7 which has an ESCR at condition B-10 (at 50° C., 10% IGEPAL) of less than 100 hours, and an Mz of greater than 450,000.

Inventive polyethylene compositions 1-9 (Inventive Examples 1-9) are made using a single site phosphinimine catalyst in a dual reactor solution process as described above and have an ESCR at condition B10 of greater than 20 hours and a SCB1/SCB2 ratio of greater than 0.50. These inventive examples also have a Mz values of less than 400,000.

Inventive polyethylene compositions 10-13 (Inventive Examples 10-13) are made using a single site phosphinimine catalyst in a dual reactor solution process as described above and have an ESCR at condition B10 of greater than 250 hours and a SCB1/SCB2 ratio of greater than 1.5. These inventive examples also have a Mz values of less than 450,000.

TABLE 1

Reactor Conditions for Inventive Examples

| | Example No. | | | | |
|---|---|---|---|---|---|
| | Inventive Example 1 | Inventive Example 2 | Inventive Example 3 | Inventive Example 4 | Inventive Example 5 |
| Reactor 1 | | | | | |
| Ethylene (kg/h) | 35.6 | 38.1 | 35.7 | 36.7 | 37.5 |
| 1-Octene (kg/h) | 4.9 | 4 | 5.3 | 4.1 | 4.8 |
| Hydrogen (g/h) | 0.51 | 0.58 | 0.51 | 0.50 | 0.50 |
| Solvent (kg/h) | 319.2 | 329 | 296.5 | 296.8 | 286.8 |
| Reactor Feed Inlet Temperature (° C.) | 30 | 30 | 30 | 30 | 30 |
| Reactor Temperature (° C.) | 138.2 | 140.5 | 141.1 | 143.8 | 149.2 |

TABLE 1-continued

| Reactor Conditions for Inventive Examples | | | | | |
|---|---|---|---|---|---|
| Titanium Catalyst to the Reactor (ppm) | 0.14 | 0.10 | 0.12 | 0.1 | 0.1 |
| Reactor 2 | | | | | |
| Ethylene (kg/h) | 43.6 | 51.6 | 43.6 | 44.9 | 45.9 |
| 1-Octene (kg/h) | 0 | 0 | 0 | 0 | 0 |
| Hydrogen (g/h) | 22.2 | 13.46 | 22.2 | 16.4 | 21 |
| Solvent (kg/h) | 106.7 | 137.2 | 129.1 | 127.5 | 135 |
| Reactor Feed Inlet Temperature (° C.) | 30 | 30 | 30 | 31.3 | 29.8 |
| Reactor Temperature (° C.) | 186.9 | 192.1 | 186.3 | 190.9 | 194 |
| Titanium Catalyst to the Reactor (ppm) | 0.29 | 0.23 | 0.21 | 0.21 | 0.24 |

| | Example No. | | | |
|---|---|---|---|---|
| | Inventive Example 6 | Inventive Example 7 | Inventive Example 8 | Inventive Example 9 |
| Reactor 1 | | | | |
| Ethylene (kg/h) | 35.7 | 35.6 | 35.7 | 38.4 |
| 1-Octene (kg/h) | 2.6 | 4.7 | 4.9 | 1.5 |
| Hydrogen (g/h) | 0.45 | 0.46 | 0.46 | 0.62 |
| Solvent (kg/h) | 256.6 | 259.1 | 258.9 | 346.3 |
| Reactor Feed Inlet Temperature (° C.) | 30 | 30 | 30 | 30 |
| Reactor Temperature (° C.) | 152.5 | 151 | 147 | 141.1 |
| Titanium Catalyst to the Reactor (ppm) | 0.08 | 0.13 | 0.10 | 0.10 |
| Reactor 2 | | | | |
| Ethylene (kg/h) | 43.6 | 43.6 | 43.6 | 51.9 |
| 1-Octene (kg/h) | 0 | 0 | 0 | 0 |
| Hydrogen (g/h) | 10.2 | 21.59 | 16.21 | 15.07 |
| Solvent (kg/h) | 171.6 | 167 | 167.1 | 121.7 |
| Reactor Feed Inlet Temperature (° C.) | 30 | 30 | 30 | 30 |
| Reactor Temperature (° C.) | 185.7 | 186.2 | 186.4 | 192.8 |
| Titanium Catalyst to the Reactor (ppm) | 0.13 | 0.22 | 0.20 | 0.31 |

| | Example No. | | | |
|---|---|---|---|---|
| | Inventive Example 10 | Inventive Example 11 | Inventive Example 12 | Inventive Example 13 |
| Reactor 1 | | | | |
| Ethylene (kg/h) | 34.1 | 34.1 | 34.1 | 32.6 |
| 1-Octene (kg/h) | 4 | 3.1 | 4.8 | 4.9 |
| Hydrogen (g/h) | 0.27 | 0.22 | 0.35 | 0.29 |
| Solvent (kg/h) | 331.3 | 345.1 | 314.4 | 311.4 |
| Reactor Feed Inlet Temperature (° C.) | 30 | 30 | 30 | 30 |
| Reactor Temperature (° C.) | 135.8 | 137 | 139.9 | 140 |
| Titanium Catalyst to the Reactor (ppm) | 0.08 | 0.13 | 0.09 | 0.13 |
| Reactor 2 | | | | |
| Ethylene (kg/h) | 41.7 | 41.7 | 41.7 | 40.0 |
| 1-Octene (kg/h) | 0 | 0 | 0 | 0 |
| Hydrogen (g/h) | 19.8 | 19.25 | 23.10 | 20.35 |
| Solvent (kg/h) | 128.8 | 115.7 | 144.9 | 151.1 |
| Reactor Feed Inlet Temperature (° C.) | 29.8 | 34.2 | 30 | 30.5 |
| Reactor Temperature (° C.) | 192.2 | 192 | 191.9 | 186.3 |
| Titanium Catalyst to the Reactor (ppm) | 0.29 | 0.21 | 0.28 | 0.21 |

TABLE 2

| | Resin Properties | | | | |
|---|---|---|---|---|---|
| | Example No. | | | | |
| | Comparative Example 1 | Comparative Example 2 | Comparative Example 3 | Comparative Example 4 | Comparative Example 5 |
| Density (g/cm$^3$) | 0.9534 | 0.9523 | 0.9526 | 0.952 | 0.953 |
| Rheology/Flow Properties | | | | | |
| Melt Index I$_2$ (g/10 min) | 1.88 | 0.625 | 1.42 | 1.92 | 0.68 |
| Melt Flow Ratio (I$_{21}$/I$_2$) | 56.9 | 51.2 | 50.5 | 77.1 | 73.2 |
| Stress Exponent | 1.41 | 1.38 | 1.36 | 1.38 | 1.38 |
| I$_{21}$ (g/10 min) | 107 | 33.1 | 71.3 | 146.0 | 49.8 |
| I$_5$ (g/10 min) | | | 4.23 | | |
| I$_{21}$/I$_5$ | | | 16.86 | | |
| Shear Viscosity at 10$^5$ s$^{-1}$ (240° C., Pa-s) | | | 5.8 | | |
| Shear Viscosity Ratio η(10 s$^{-1}$)/η(1000 s$^{-1}$) at 240° C. | | | 12.0 | | |
| DMA Data (190° C.) | | | η* = 5832 Pa * s at G* = 2.099 kPa; η* = 5591 Pa * s at G* = 2.795 kPa | | |
| GPC | | | | | |
| M$_n$ | 14393 | 22392 | 17827 | 9891 | 12424 |
| M$_w$ | 91663 | 109626 | 105289 | 77319 | 104353 |
| M$_z$ | 325841 | 299470 | 282159 | 245479 | 327007 |
| Polydispersity Index (M$_w$/M$_n$) | 6.37 | 4.9 | 5.91 | 7.82 | 8.4 |
| M$_z$/M$_w$ | 3.55 | 3.56 | 2.68 | 3.17 | 3.13 |
| Broadness Factor (M$_w$/M$_n$)/(M$_z$/M$_w$) | 1.79 | 1.38 | 2.21 | 2.47 | 2.68 |
| Branch Frequency - FTIR (uncorrected for chain end —CH$_3$) | | | | | |
| Uncorrected SCB/1000C | 2.2 | 2 | 2.2 | 3.7 | 2.5 |
| Uncorrected comonomer content (mol %) | 0.4 | 0.4 | 0.4 | 0.7 | 0.5 |
| Comonomer ID | 1-octene | 1-octene | 1-octene | 1-octene | 1-octene |
| Comonomer mol % measured by $^{13}$C-NMR | | | | | |
| Hexyl + branches(≥4 carbon atoms), mol % | 0.3 | 0.2 | 0.28 | | |
| Slow-CTREF | | | | | |
| CDBI$_{50}$ (wt. %) | | | 63 | | |
| CDBI$_{25}$ (wt. %) | | | | | |
| DSC | | | | | |
| Primary Melting Peak (° C.) | 128.3 | 129.7 | 129.11 | 126.8 | 128.42 |
| Heat of Fusion (J/g) | 204.7 | 198.2 | 207.7 | 200.3 | 213.80 |
| Crystallinity (%) | 70.58 | 68.34 | 71.61 | 69.08 | 73.72 |
| Other properties | | | | | |
| Hexane Extractables (wt %) | 0.44 | 0.46 | 0.32 | 0.73 | 0.57 |
| VICAT Soft. Pt. (° C.) - Plaque | 126 | 127 | 127.3 | 122 | 125 |
| Heat Deflection Temp. [° C.] @ 66 PSI | 72 | 71 | 68.2 | 68 | 71 |

TABLE 2-continued

Resin Properties

| | Comparative Example 6 | Comparative Example 7 | Inventive Example 1 | Inventive Example 2 | Inventive Example 3 |
|---|---|---|---|---|---|
| Density (g/cm$^3$) | 0.955 | 0.955 | 0.9529 | 0.9524 | 0.9524 |
| Rheology/Flow Properties | | | | | |
| Melt Index $I_2$ (g/10 min) | 1.5 | 2.5 | 1.57 | 2.94 | 1.69 |
| Melt Flow Ratio ($I_{21}/I_2$) | 66 | 51 | 58 | 44.1 | 61 |
| Stress Exponent | 1.58 | 1.53 | 1.38 | 1.36 | 1.38 |
| $I_{21}$ (g/10 min) | 99 | 113 | 90 | 129 | 104 |
| $I_5$ (g/10 min) | 5.31 | 7.8 | 4.72 | | 4.94 |
| $I_{21}/I_5$ | 18.64 | | 19.07 | | 21.05 |
| Shear Viscosity at $10^5$ s$^{-1}$ (240° C., Pa-s) | 6.2 | 6.63 | 5.1 | 6.2 | 4.8 |
| Shear Viscosity Ratio $\eta(10\ s^{-1})/\eta(1000\ s^{-1})$ at 240° C. | 11.3 | 9.48 | 13.5 | 8.1 | 13.0 |
| DMA Data (190° C.) | | | $\eta^* = 5294$ Pa * s at $G^* = 2.647$ kPa; $\eta^* = 5106$ Pa * s at $G^* = 3.547$ kPa | | $\eta^* = 4889$ Pa * s at $G^* = 2.445$ kPa; $\eta^* = 4739$ Pa * s at $G^* = 3.292$ kPa |
| GPC | | | | | |
| $M_n$ | 10240 | 17100 | 10524 | 15679 | 10579 |
| $M_w$ | 106992 | 102000 | 83712 | 74090 | 86319 |
| $M_z$ | 533971 | 470400 | 256210 | 215369 | 291056 |
| Polydispersity Index ($M_w/M_n$) | 10.45 | 5.96 | 7.95 | 4.73 | 8.16 |
| $M_z/M_w$ | 4.99 | 4.61 | 3.06 | 2.91 | 3.37 |
| Broadness Factor ($M_w/M_n$)/($M_z/M_w$) | 2.09 | 1.29 | 2.60 | 1.63 | 2.42 |
| Branch Frequency - FTIR (uncorrected for chain end —CH$_3$) | | | | | |
| Uncorrected SCB/1000C | 2.3 | 2.5 | 3 | 1.8 | 3 |
| Uncorrected comonomer content (mol %) | 0.5 | 0.5 | 0.6 | 0.4 | 0.6 |
| Comonomer ID | 1-hexene | 1-hexene | 1-octene | 1-octene | 1-octene |
| Comonomer mol % measured by $^{13}$C-NMR | | | | | |
| Hexyl + branches(≥4 carbon atoms), mol % | | 0.68 | 0.4 | | 0.4 |
| Slow-CTREF | | | | | |
| CDBI$_{50}$ (wt. %) | 63.4 | 67.3 | | | |
| CDBI$_{25}$ (wt. %) | 39 | 49.8 | 65.4 | 61.8 | 61.8 |
| DSC | | | | | |
| Primary Melting Peak (° C.) | 130.06 | 131.24 | 127.3 | 128.8 | 127.5 |
| Heat of Fusion (J/g) | 217.4 | 217.6 | 203.8 | 206.1 | 207.3 |
| Crystallinity (%) | 74.98 | 75.04 | 70.27 | 71.08 | 71.48 |
| Other properties | | | | | |
| Hexane Extractables (wt %) | 0.36 | 0.48 | 0.36 | 0.22 | 0.42 |
| VICAT Soft. Pt. (° C.) - Plaque | 126.8 | 126.6 | 125.2 | 126.8 | 124.8 |
| Heat Deflection Temp. [° C.] @ 66 PSI | 73 | 76.4 | 68 | 74.1 | 76 |

TABLE 2-continued

| Resin Properties | | | | | |
|---|---|---|---|---|---|
| | Example No. | | | | |
| | Inventive Example 4 | Inventive Example 5 | Inventive Example 6 | Inventive Example 7 | Inventive Example 8 |
| Density (g/cm$^3$) | 0.9523 | 0.9532 | 0.9527 | 0.9534 | 0.9522 |
| Rheology/Flow Properties | | | | | |
| Melt Index $I_2$ (g/10 min) | 1.5 | 1.78 | 1.29 | 2.05 | 1.31 |
| Melt Flow Ratio ($I_{21}/I_2$) | 54.8 | 55.6 | 44.1 | 55 | 64 |
| Stress Exponent | 1.4 | 1.37 | 1.35 | 1.34 | 1.39 |
| $I_{21}$ (g/10 min) | 82.3 | 99.1 | 57 | 113 | 83 |
| $I_5$ (g/10 min) | 4.5 | 5.33 | | 6.21 | |
| $I_{21}/I_5$ | 18.29 | 18.59 | | 18.20 | |
| Shear Viscosity at $10^5$ s$^{-1}$ (240° C., Pa-s) | 5.8 | 5.1 | 6.3 | 5.0 | 5.8 |
| Shear Viscosity Ratio $\eta(10\ s^{-1})/\eta(1000\ s^{-1})$ at 240° C. | 14.8 | 13.3 | 11.6 | 12.1 | 14.8 |
| DMA Data (190° C.) | | | $\eta^*$ = 6707 Pa * s at G* = 2.413 kPa; $\eta^*$ = 6465 Pa * s at G* = 3.232 kPa | | $\eta^*$ = 6688 Pa * s at G* = 2.407 kPa; $\eta^*$ = 6472 Pa * s at G* = 3.236 kPa |
| GPC | | | | | |
| $M_n$ | 13309 | 9716 | 18449 | 11145 | 14021 |
| $M_w$ | 88295 | 84943 | 93080 | 80630 | 93175 |
| $M_z$ | 278141 | 288665 | 272788 | 243944 | 303823 |
| Polydispersity Index ($M_w/M_n$) | 6.63 | 8.74 | 5.05 | 7.23 | 6.65 |
| $M_z/M_w$ | 3.15 | 3.40 | 2.93 | 3.03 | 3.26 |
| Broadness Factor ($M_w/M_n$)/($M_z/M_w$) | 2.10 | 2.57 | 1.72 | 1.43 | 2.04 |
| Branch Frequency - FTIR (uncorrected for chain end —CH$_3$) | | | | | |
| Uncorrected SCB/1000C | 2.1 | 2.5 | 1.7 | 2.8 | 2.2 |
| Uncorrected comonomer content (mol %) | 0.4 | 0.5 | 0.3 | 0.6 | 0.4 |
| Comonomer ID | 1-octene | 1-octene | 1-octene | 1-octene | 1-octene |
| Comonomer mol % measured by $^{13}$C-NMR | | | | | |
| Hexyl + branches(>=4 carbon atoms), mol % | 0.3 | | | | |
| Slow-CTREF | | | | | |
| CDBI$_{50}$ (wt. %) | 76.5 | 75.2 | 86.2 | 79.7 | 80.4 |
| CDBI$_{25}$ (wt. %) | | | | | |
| DSC | | | | | |
| Primary Melting Peak (° C.) | 129 | 128.3 | 129.8 | 127.9 | 128.4 |
| Heat of Fusion (J/g) | 209 | 207.3 | 208.5 | 211.1 | 205.4 |
| Crystallinity (%) | 72.08 | 71.48 | 71.9 | 72.8 | 70.82 |
| Other properties | | | | | |
| Hexane Extractables (wt %) | 0.25 | 0.33 | 0.25 | 0.38 | 0.27 |
| VICAT Soft. Pt. (° C.) - Plaque | 126.4 | 125.4 | 128.2 | 125.2 | 126.2 |
| Heat Deflection Temp. [° C.] @ 66 PSI | 67.3 | 69.8 | 68.2 | 66.8 | 69 |

TABLE 2-continued

Resin Properties

| | Example No. | | | | |
|---|---|---|---|---|---|
| | Inventive Example 9 | Inventive Example 10 | Inventive Example 11 | Inventive Example 12 | Inventive Example 13 |
| Density (g/cm$^3$) | 0.9568 | 0.9545 | 0.9532 | 0.9543 | 0.9522 |
| Rheology/Flow Properties | | | | | |
| Melt Index I$_2$ (g/10 min) | 1.68 | 0.67 | 0.76 | 1.15 | 1.35 |
| Melt Flow Ratio (I$_{21}$/I$_2$) | 54.2 | 53 | 48.3 | 84 | 88 |
| Stress Exponent | 1.40 | 1.38 | 1.39 | 1.39 | 1.38 |
| I$_{21}$ (g/10 min) | 91 | 53 | 48.3 | 84 | 88 |
| I$_5$ (g/10 min) | | 2.14 | 2.36 | 3.54 | 4.12 |
| I$_6$ (g/10 min) | | 3.07 | 3.5 | 5.29 | 6.18 |
| I$_{21}$/I$_5$ | | 24.77 | 20.47 | 23.73 | 21.36 |
| Shear Viscosity at 10$^5$ s$^{-1}$ (240° C., Pa-s) | 6.0 | 4.8 | 5.1 | 4.4 | 4.6 |
| Shear Viscosity Ratio $\eta(10\ s^{-1})/\eta(1000\ s^{-1})$ at 240° C. | 11.2 | 22.3 | 19.1 | 17.9 | 14.6 |
| DMA Data (190° C.) | | | | | |
| GPC | | | | | |
| M$_n$ | 15110 | 10953 | 10876 | 9202 | 9424 |
| M$_w$ | 85227 | 112697 | 112804 | 98160 | 86829 |
| M$_z$ | 287035 | 388883 | 375939 | 332900 | 286320 |
| Polydispersity Index (M$_w$/M$_n$) | 5.64 | 10.29 | 10.37 | 10.67 | 9.21 |
| M$_z$/M$_w$ | 3.37 | 3.45 | 3.33 | 3.39 | 3.30 |
| Broadness Factor (M$_w$/M$_n$)/(M$_z$/M$_w$) | 1.67 | 2.98 | 3.11 | 3.15. | 2.79 |
| Branch Frequency - FTIR (uncorrected for chain end —CH$_3$) | | | | | |
| Uncorrected SCB/1000C | 1.3 | 2.5 | 2.5 | 2.9 | 3.2 |
| Uncorrected comonomer content (mol %) | 0.3 | 0.5 | 0.5 | 0.6 | 0.6 |
| Comonomer ID | 1-octene | 1-octene | 1-octene | 1-octene | 1-octene |
| Comonomer mol % measured by $^{13}$C-NMR | | | | | |
| Hexyl + branches(>=4 carbon atoms), mol % | | | | | |
| Slow-CTREF | | | | | |
| CDBI$_{50}$ (wt. %) | 77.8 | 73 | 75.7 | 71.9 | 77.3 |
| CDBI$_{25}$ (wt. %) | | 64.4 | 66.5 | 64.1 | 69.4 |
| DSC | | | | | |
| Primary Melting Peak (° C.) | 130.7 | 128.76 | 128.69 | 128.29 | 127.52 |
| Heat of Fusion (J/g) | 213.8 | 221.5 | 217.1 | 218.8 | 215.2 |
| Crystallinity (%) | 73.73 | 76.39 | 74.86 | 75.45 | 74.22 |
| Other properties | | | | | |
| Hexane Extractables (wt %) | 0.24 | 0.40 | 0.30 | 0.53 | 0.46 |
| VICAT Soft. Pt. (° C.) - Plaque | 128.4 | 126.1 | 126.2 | 125.6 | 124.7 |
| Heat Deflection Temp. [° C.] @ 66 PSI | 77.6 | 78 | 74.6 | 75.7 | 67.4 |

TABLE 3

| Polyethylene Component Properties (Comparative Examples) | | | | | |
|---|---|---|---|---|---|
| | Example No. | | | | |
| | Comparative Example 1 | Comparative Example 2 | Comparative Example 3 | Comparative Example 4 | Comparative Example 5 |
| Density (g/cm$^3$) | 0.9534 | 0.9523 | 0.9526 | 0.952 | 0.953 |
| $I_2$ (g/10 min.) | 1.88 | 0.625 | 1.42 | 1.92 | 0.68 |
| Stress Exponent | 1.41 | 1.38 | 1.36 | 1.38 | 1.38 |
| MFR ($I_{21}/I_2$) | 56.9 | 51.2 | 50.5 | 77.1 | 73.2 |
| Mw/Mn | 6.37 | 4.9 | 6.34 | 7.82 | 8.39 |
| 1$^{st}$ Ethylene Copolymer | | | | | |
| weight % | 0.43 | 0.43 | 0.433 | 0.426 | 0.449 |
| Mw | 162400 | 214300 | 176200 | 169500 | 213200 |
| $I_2$ (g/10 min.) | 0.13 | 0.05 | 0.10 | 0.11 | 0.05 |
| Density 1, d$_1$ (g/cm$^3$) | 0.9389 | 0.9356 | 0.9334 | 0.9382 | 0.9363 |
| SCB1 per 1000Cs | 0.15 | 0.13 | 1.07 | 0.18 | 0.06 |
| mol % 1-octene | 0.03 | 0.03 | 0.21 | 0.04 | 0.01 |
| 2$^{nd}$ Ethylene Copolymer | | | | | |
| weight % | 0.57 | 0.57 | 0.567 | 0.574 | 0.551 |
| Mw | 18500 | 25600 | 17300 | 11700 | 14300 |
| $I_2$ (g/10 min.) | 736 | 190 | 979 | 5082 | 2148 |
| Density 2, d$_2$ (g/cm$^3$) | 0.9559 | 0.9522 | 0.9528 | 0.9559 | 0.9565 |
| SCB2 per 1000Cs | 1.06 | 1.37 | 2.16 | 2.1 | 1.42 |
| mol % 1-octene | 0.21 | 0.27 | 0.43 | 0.42 | 0.28 |
| Estimated (d$_2$ − d$_1$), g/cm$^3$ | 0.017 | 0.0166 | 0.0194 | 0.0177 | 0.0202 |
| Estimated (SCB2 − SCB1) | 0.91 | 1.24 | 1.09 | 1.92 | 1.36 |
| SCB1/SCB2 | 0.14 | 0.09 | 0.50 | 0.09 | 0.04 |

| | Example No. | | | |
|---|---|---|---|---|
| | Inventive Example 3 | Inventive Example 4 | Inventive Example 5 | Inventive Example 7 |
| Density (g/cm$^3$) | 0.9524 | 0.9523 | 0.9532 | 0.9534 |
| $I_2$ (g/10 min.) | 1.69 | 1.5 | 1.78 | 2.05 |
| Stress Exponent | 1.38 | 1.4 | 1.37 | 1.34 |
| MFR ($I_{21}/I_2$) | 61 | 54.8 | 55.6 | 55 |
| Mw/Mn | 8.16 | 6.63 | 8.74 | 7.23 |
| 1$^{st}$ Ethylene Copolymer | | | | |
| weight % | 0.455 | 0.454 | 0.454 | 0.453 |
| Mw | 165100 | 168100 | 162700 | 157200 |
| $I_2$ (g/10 min.) | 0.13 | 0.12 | 0.13 | 0.15 |
| Density 1, d$_1$ (g/cm$^3$) | 0.9325 | 0.9302 | 0.9322 | 0.9316 |
| SCB1 per 1000Cs | 1.57 | 2.24 | 1.71 | 2.02 |
| mol % 1-octene | 0.31 | 0.45 | 0.34 | 0.40 |
| 2$^{nd}$ Ethylene Copolymer | | | | |
| weight % | 0.545 | 0.546 | 0.546 | 0.547 |
| Mw | 11100 | 14900 | 12100 | 11400 |
| $I_2$ (g/10 min.) | 6318 | 1817 | 4419 | 5739 |
| Density 2, d$_2$ (g/cm$^3$) | 0.9614 | 0.9555 | 0.959 | 0.9577 |
| SCB2 per 1000Cs | 0.63 | 1.64 | 1.08 | 1.59 |
| mol % 1-octene | 0.13 | 0.33 | 0.22 | 0.32 |
| Estimated (d$_2$ − d$_1$), g/cm$^3$ | 0.0289 | 0.0253 | 0.0268 | 0.0261 |
| Estimated (SCB2 − SCB1) | −0.94 | −0.6 | −0.63 | −0.43 |
| SCB1/SCB2 | 2.5 | 1.37 | 1.58 | 1.27 |

TABLE 3-continued

Polyethylene Component Properties (Comparative Examples)

| | Example No. | | | |
|---|---|---|---|---|
| | Inventive Example 10 | Inventive Example 11 | Inventive Example 12 | Inventive Example 13 |
| Density (g/cm$^3$) | 0.9545 | 0.9532 | 0.9543 | 0.9522 |
| $I_2$ (g/10 min.) | 0.67 | 0.76 | 1.15 | 1.35 |
| Stress Exponent | 1.38 | 1.39 | 1.39 | 1.38 |
| MFR ($I_{21}/I_2$) | 79 | 64 | 73 | 64 |
| Mw/Mn | 10.29 | 10.37 | 10.67 | 9.21 |
| 1$^{st}$ Ethylene Copolymer | | | | |
| weight % | 0.429 | 0.464 | 0.423 | 0.433 |
| Mw | 226800 | 201800 | 199000 | 185900 |
| $I_2$ (g/10 min.) | 0.04 | 0.06 | 0.06 | 0.08 |
| Density 1, $d_1$ (g/cm$^3$) | 0.9295 | 0.9299 | 0.9312 | 0.9318 |
| SCB1 per 1000Cs | 1.3 | 1.6 | 1.28 | 1.35 |
| mol % 1-octene | 0.26 | 0.32 | 0.26 | 0.27 |
| 2$^{nd}$ Ethylene Copolymer | | | | |
| weight % | 0.571 | 0.536 | 0.577 | 0.567 |
| Mw | 10900 | 11200 | 9300 | 10000 |
| $I_2$ (g/10 min.) | 6980 | 6163 | 13434 | 10206 |
| Density 2, $d_2$ (g/cm$^3$) | 0.9643 | 0.9631 | 0.9639 | 0.9640 |
| SCB2 per 1000Cs | 0.15 | 0.29 | 0.38 | 0.29 |
| mol % 1-octene | 0.03 | 0.06 | 0.08 | 0.06 |
| Estimated ($d_2 - d_1$), g/cm$^3$ | 0.0348 | 0.0332 | 0.0327 | 0.0322 |
| SCB1/SCB2 | 8.67 | 5.52 | 3.37 | 4.66 |

TABLE 4

Plaque Properties

| | Example No. | | | | |
|---|---|---|---|---|---|
| | Comparative Example 1 | Comparative Example 2 | Comparative Example 3 | Comparative Example 4 | Comparative Example 5 |
| Environmental Stress Crack Resistance | | | | | |
| ESCR Cond. B at 10% (hours) | <24 | <24 | <24 | <24 | <24 |
| Flexural Properties (Plaques) | | | | | |
| Flex Secant Mod. 1% (MPa) | 1035 | 1070 | 1198 | 1062 | 1201 |
| Flex Sec Mod 1% (MPa) Dev. | 25 | 37 | 38 | 34 | 41 |
| Flex Secant Mod. 2% (MPa) | 877 | 906 | 1011 | 904 | 1002 |
| Flex Sec Mod 2% (MPa) Dev. | 19 | 29 | 22 | 28 | 32 |
| Flexural Strength (MPa) | 31.5 | 33.4 | 35.1 | 33 | 35.5 |
| Flexural Strength Dev. (MPa) | 0.6 | 0.7 | 0.4 | 0.9 | 0.6 |
| Tensile Properties (Plaques) | | | | | |
| Elong. at Yield (%) | 10.2 | 10.3 | 10 | 10.3 | 10.2 |
| Elong. at Yield Dev. (%) | 0.8 | 1 | 0 | 0.3 | 0.4 |
| Yield Strength (MPa) | 26.6 | 25.4 | 26.3 | 25.7 | 26.9 |
| Yield Strength Dev. (MPa) | 0.3 | 0.4 | 0.6 | 0.6 | 0.3 |
| Ultimate Elong. (%) | 920 | 1003 | 858 | 535 | 800 |
| Ultimate Elong. Dev. (%) | 94.6 | 23.7 | 37 | 167.4 | 86.1 |
| Ultimate Strength (MPa) | 21.5 | 33.8 | 21.4 | 14.8 | 20.7 |
| Ultimate Strength Dev. (MPa) | 4.1 | 1.1 | 1.8 | 0.7 | 6.7 |
| Sec Mod 1% (MPa) | 1374 | 1138 | 1294 | 1244 | 1237 |
| Sec Mod 1% (MPa) Dev. | 276.4 | 210.8 | 188 | 47.1 | 83 |
| Sec Mod 2% (MPa) | 937 | 834 | 900 | 858 | 888 |
| Sec Mod 2% (MPa) Dev. | 71 | 61 | 44 | 24 | 47 |
| Impact Properties (Plaques) | | | | | |
| Notched Izod Impact (J/m) | 76 | 139 | 64.1 | 69.4 | 97.1 |
| IZOD DV (J/m) | 7 | 7 | 5.3 | 6.9 | 2.8 |

TABLE 4-continued

Plaque Properties

| | Comparative Example 6 | Comparative Example 7 | Inventive Example 1 | Inventive Example 2 | Inventive Example 3 |
|---|---|---|---|---|---|
| Environmental Stress Crack Resistance | | | | | |
| ESCR Cond. B at 10% (hours) | 196 | 78 | 309 | 23 | 212 |
| Flexural Properties (Plaques) | | | | | |
| Flex Secant Mod. 1% (MPa) | 1372 | 1304 | 1274 | 1247 | 1267 |
| Flex Sec Mod 1% (MPa) Dev. | 87 | 46 | 39 | 44 | 19 |
| Flex Secant Mod. 2% (MPa) | 1167 | 1102 | 1064 | 1035 | 1060 |
| Flex Sec Mod 2% (MPa) Dev. | 45 | 41 | 29 | 33 | 14 |
| Flexural Strength (MPa) | 40.4 | 38.3 | 37.5 | 36.7 | 37.1 |
| Flexural Strength Dev. (MPa) | 1 | 0.6 | 0.8 | 0.4 | 0.3 |
| Tensile Properties (Plaques) | | | | | |
| Elong. at Yield (%) | 9 | 9 | 9 | 10 | 8 |
| Elong. at Yield Dev. (%) | 1 | 1 | 1 | 1 | 0 |
| Yield Strength (MPa) | 28.5 | 26.4 | 26 | 25.6 | 26.4 |
| Yield Strength Dev. (MPa) | 0.3 | 0.3 | 0.2 | 0.1 | 0.3 |
| Ultimate Elong. (%) | 870 | 1055 | 701 | 988 | 762 |
| Ultimate Elong. Dev. (%) | 69 | 42 | 106 | 58 | 98 |
| Ultimate Strength (MPa) | 26.8 | 31.6 | 21.8 | 32.2 | 24.7 |
| Ultimate Strength Dev. (MPa) | 5.5 | 1 | 6.8 | 1.9 | 7.4 |
| Sec Mod 1% (MPa) | 1696 | 1545 | 1483 | 1256 | 1331 |
| Sec Mod 1% (MPa) Dev. | 279 | 231 | 121 | 333 | 241 |
| Sec Mod 2% (MPa) | 1118 | 993 | 973 | 880 | 939 |
| Sec Mod 2% (MPa) Dev. | 90 | 91 | 33 | 88 | 62 |
| Impact Properties (Plaques) | | | | | |
| Notched Izod Impact (J/m) | 80.1 | 80 | 74.7 | 69.4 | 69.4 |
| IZOD DV (J/m) | 5.3 | | 0.0 | 0.0 | 0.0 |

| | Inventive Example 4 | Inventive Example 5 | Inventive Example 6 | Inventive Example 7 | Inventive Example 8 |
|---|---|---|---|---|---|
| Environmental Stress Crack Resistance | | | | | |
| ESCR Cond. B at 10% (hours) | 86 | 83 | 60 | 73 | 157 |
| Flexural Properties (Plaques) | | | | | |
| Flex Secant Mod. 1% (MPa) | 1295 | 1304 | 1240 | 1318 | 1260 |
| Flex Sec Mod 1% (MPa) Dev. | 23 | 57 | 31 | 37 | 25 |
| Flex Secant Mod. 2% (MPa) | 1085 | 1092 | 1026 | 1098 | 1049 |
| Flex Sec Mod 2% (MPa) Dev. | 21 | 40 | 26 | 24 | 15 |
| Flexural Strength (MPa) | 37.3 | 37.6 | 36.1 | 38.2 | 36.9 |
| Flexural Strength Dev. (MPa) | 0.4 | 0.8 | 0.6 | 0.3 | 0.6 |
| Tensile Properties (Plaques) | | | | | |
| Elong. at Yield (%) | 10 | 9 | 10 | 8 | 9 |
| Elong. at Yield Dev. (%) | 0 | 0 | 0 | 0 | 1 |
| Yield Strength (MPa) | 26.3 | 26.4 | 25.6 | 26.9 | 26.1 |
| Yield Strength Dev. (MPa) | 0.3 | 0.2 | 0.2 | 0.2 | 0.2 |
| Ultimate Elong. (%) | 891 | 862 | 974 | 766 | 836 |
| Ultimate Elong. Dev. (%) | 23 | 47 | 35 | 130 | 103 |
| Ultimate Strength (MPa) | 33.3 | 29.7 | 36.3 | 22.9 | 29.6 |
| Ultimate Strength Dev. (MPa) | 2 | 2.7 | 1.5 | 7 | 5.5 |
| Sec Mod 1% (MPa) | 1230 | 1197 | 1333 | 1429 | 1395 |
| Sec Mod 1% (MPa) Dev. | 90 | 128 | 213 | 183 | 217 |
| Sec Mod 2% (MPa) | 913 | 881 | 893 | 979 | 934 |
| Sec Mod 2% (MPa) Dev. | 34 | 40 | 70 | 52 | 73 |
| Impact Properties (Plaques) | | | | | |
| Notched Izod Impact (J/m) | 80.1 | 64.1 | 128.1 | 64.1 | 80.1 |
| IZOD DV (J/m) | 2.7 | 2.1 | 5.3 | 0.0 | 0.0 |

TABLE 4-continued

Plaque Properties

| | Example No. | | | | |
|---|---|---|---|---|---|
| | Inventive Example 9 | Inventive Example 10 | Inventive Example 11 | Inventive Example 12 | Inventive Example 13 |
| Environmental Stress Crack Resistance | | | | | |
| ESCR Cond. B at 10% (hours) | 24 | 1100 | 720 | 399 to 484 | 655 |
| Flexural Properties (Plaques) | | | | | |
| Flex Secant Mod. 1% (MPa) | 1402 | 1341 | 1330 | 1354 | 1297 |
| Flex Sec Mod 1% (MPa) Dev. | 48 | 34 | 30 | 34 | 27 |
| Flex Secant Mod. 2% (MPa) | 1159 | 1131 | 1119 | 1138 | 1095 |
| Flex Sec Mod 2% (MPa) Dev. | 35 | 26 | 22 | 26 | 16 |
| Flexural Strength (MPa) | 39.8 | 39.1 | 38.4 | 38.7 | 38.1 |
| Flexural Strength Dev. (MPa) | 1.1 | 0.4 | 0.5 | 0.4 | 0.6 |
| Tensile Properties (Plaques) | | | | | |
| Elong. at Yield (%) | 10 | 9 | 8 | 8 | 9 |
| Elong. at Yield Dev. (%) | 0 | 1 | 1 | 1 | 1 |
| Yield Strength (MPa) | 28.2 | 27.2 | 26.9 | 27.7 | 26.1 |
| Yield Strength Dev. (MPa) | 0.6 | 0.5 | 0.4 | 0.5 | 0.5 |
| Ultimate Elong. (%) | 923 | 810 | 821 | 747 | 694 |
| Ultimate Elong. Dev. (%) | 104 | 73 | 103 | 94 | 95 |
| Ultimate Strength (MPa) | 26.9 | 33 | 33.2 | 24.3 | 23 |
| Ultimate Strength Dev. (MPa) | 6.9 | 5.7 | 8.4 | 7.4 | 6.9 |
| Sec Mod 1% (MPa) | 1367 | 1586 | 1624 | 1506 | 1358 |
| Sec Mod 1% (MPa) Dev. | 190 | 258 | 323 | 369 | 207 |
| Sec Mod 2% (MPa) | 966 | 1031 | 1031 | 1034 | 950 |
| Sec Mod 2% (MPa) Dev. | 67 | 65 | 97 | 113 | 48 |
| Impact Properties (Plaques) | | | | | |
| Notched Izod Impact (J/m) | 90.7 | 107.0 | 107.0 | 69.4 | 80.0 |
| IZOD DV (J/m) | 5.3 | 5.3 | 5.3 | 0.0 | 5.3 |

As can be seen from the data provided in Tables 2, 3 and 4, the Inventive polyethylene compositions (Inventive Examples 1-9) which have a ratio of short chain branching SCB1/SCB2 of greater than 0.5, have improved ESCR B properties while maintaining good processability.

As shown in FIG. 1, inventive polyethylene compositions 1, 10, 11 and 13 provide an improved balance of ESCR and stiffness (as indicated by 2% secant floral modulus) when compared to comparative polyethylene compositions 6, and 7.

Figure 2:
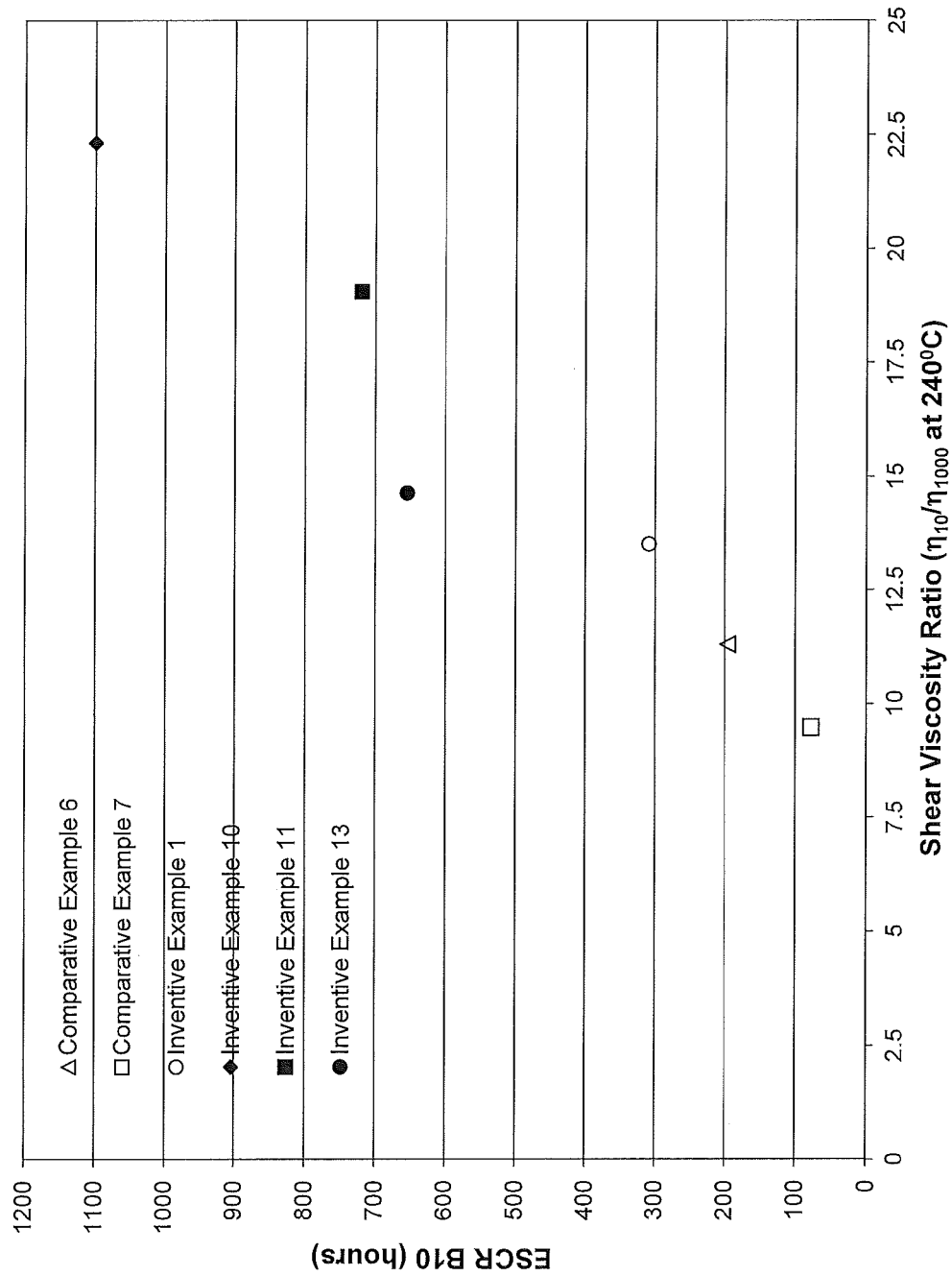
FIG. 2 shows a plot of the ESCR in hours (the ESCR B10 for a molded plaque) against the shear viscosity ratio ($\eta_{10}/\eta_{1000}$ at 240° C.) for selected inventive and comparative polyethylene composition examples.

As shown in FIG. 2, inventive polyethylene compositions 1, 10, 11 and 13 provide an improved balance of ESCR and processability (as indicated by the "shear viscosity ratio") when compared to comparative polyethylene compositions 6 and 7.

Figure 3:
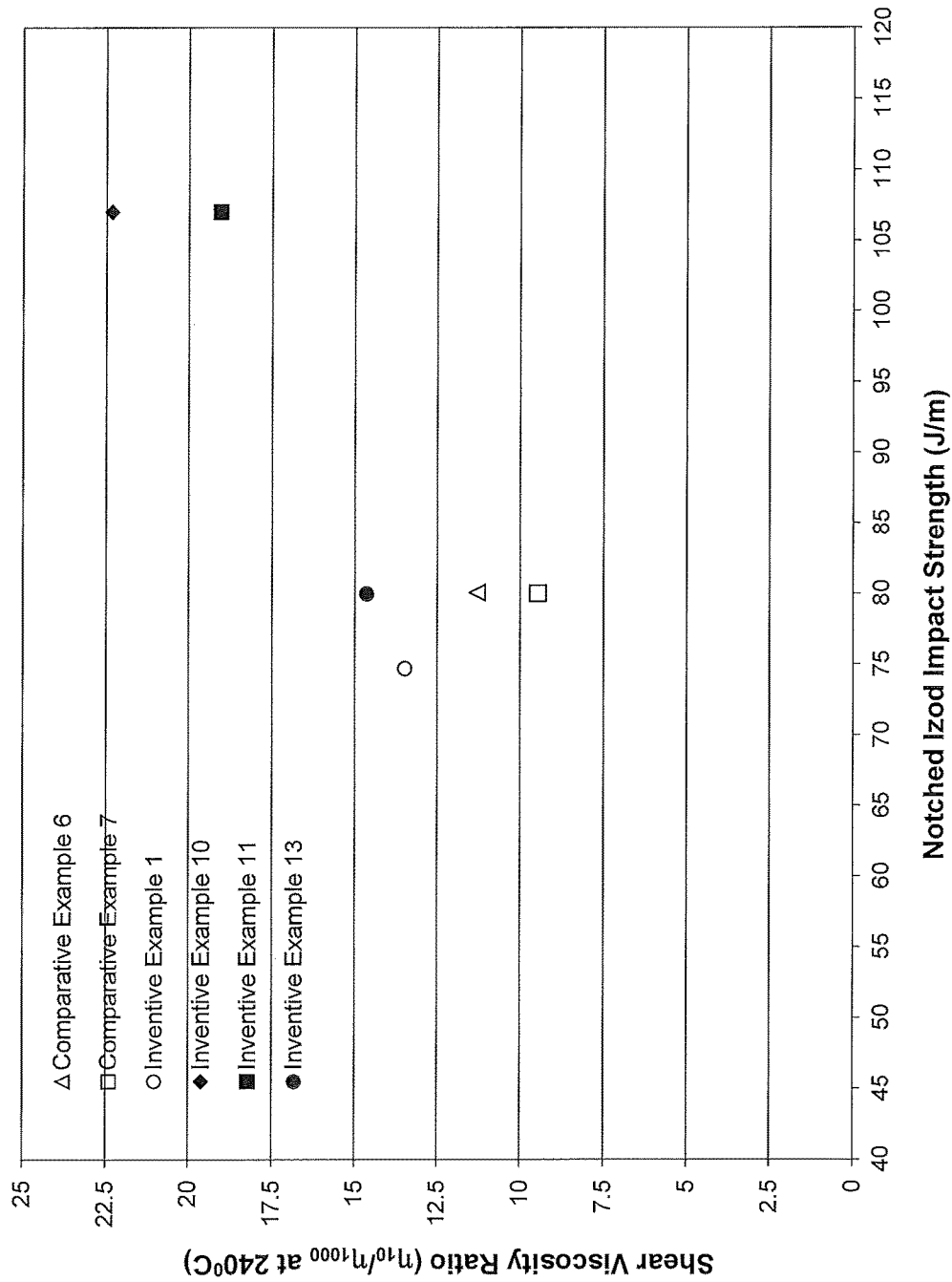
FIG. 3 shows a plot of the shear viscosity ratio ($\eta_{10}/\eta_{1000}$ at 240° C.) against the notched Izod Impact Strength (J/m) for selected inventive and comparative polyethylene composition examples.

As shown in FIG. 3, inventive polyethylene compositions 1, 10, 11 and 13 provide an improved balance of processability (as indicated by the "shear viscosity ratio") and Notched Izod Impact Strength, when compared to comparative polyethylene compositions 6 and 7.

Figure 4:
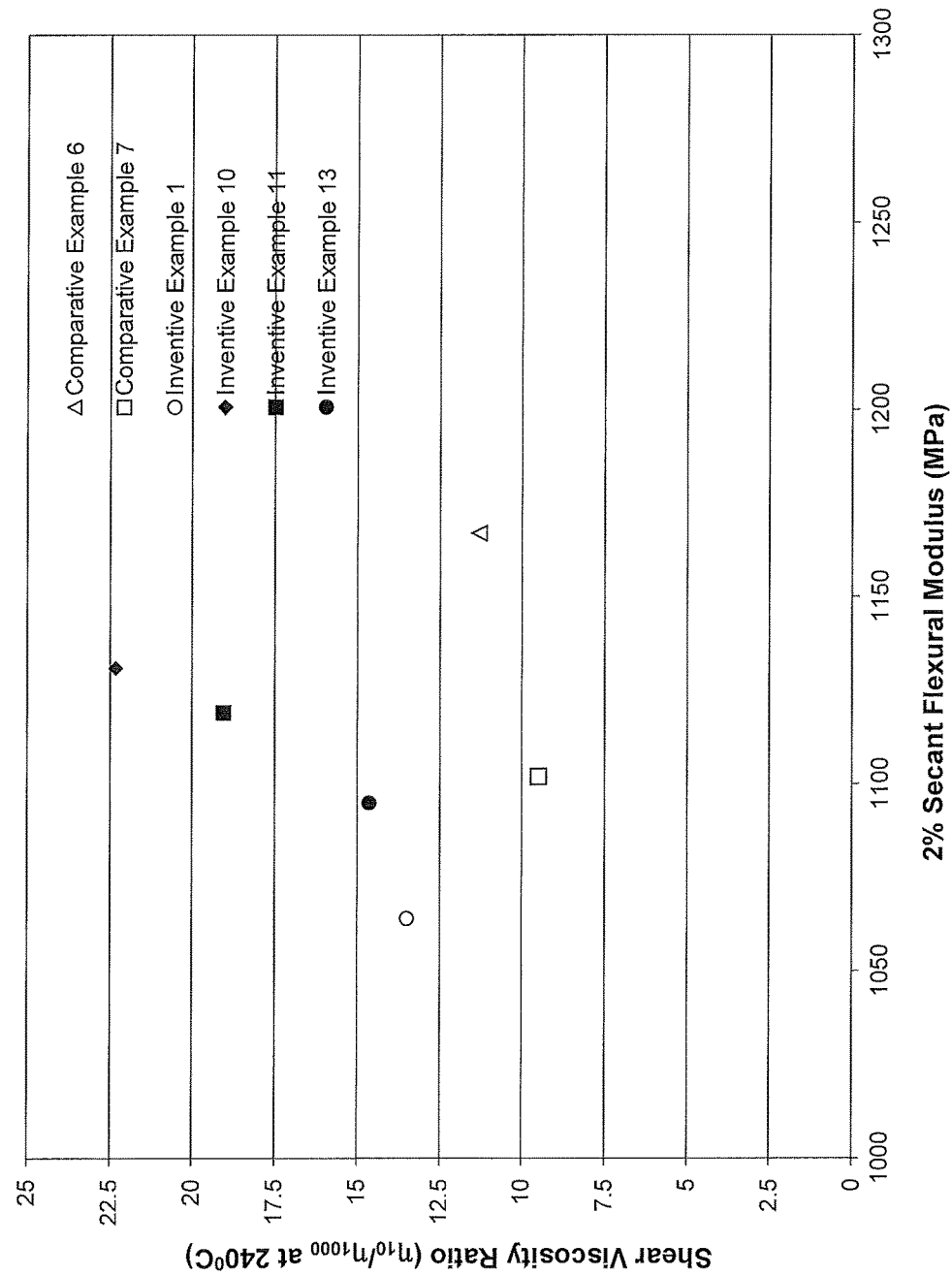
FIG. 4 shows a plot of the shear viscosity ratio ($\eta_{10}/\eta_{1000}$ at 240° C.) against the 2% secant flexural modulus (MPa) for selected inventive and comparative polyethylene composition examples.

FIG. 4 shows that inventive polyethylene compositions 1, 10, 11 and 13 have an improved balance of processability (as indicated by the "shear viscosity ratio") and stiffness (as indicated by 2% secant floral modulus) when compared to comparative polyethylene compositions 6, and 7.

Figure 5:
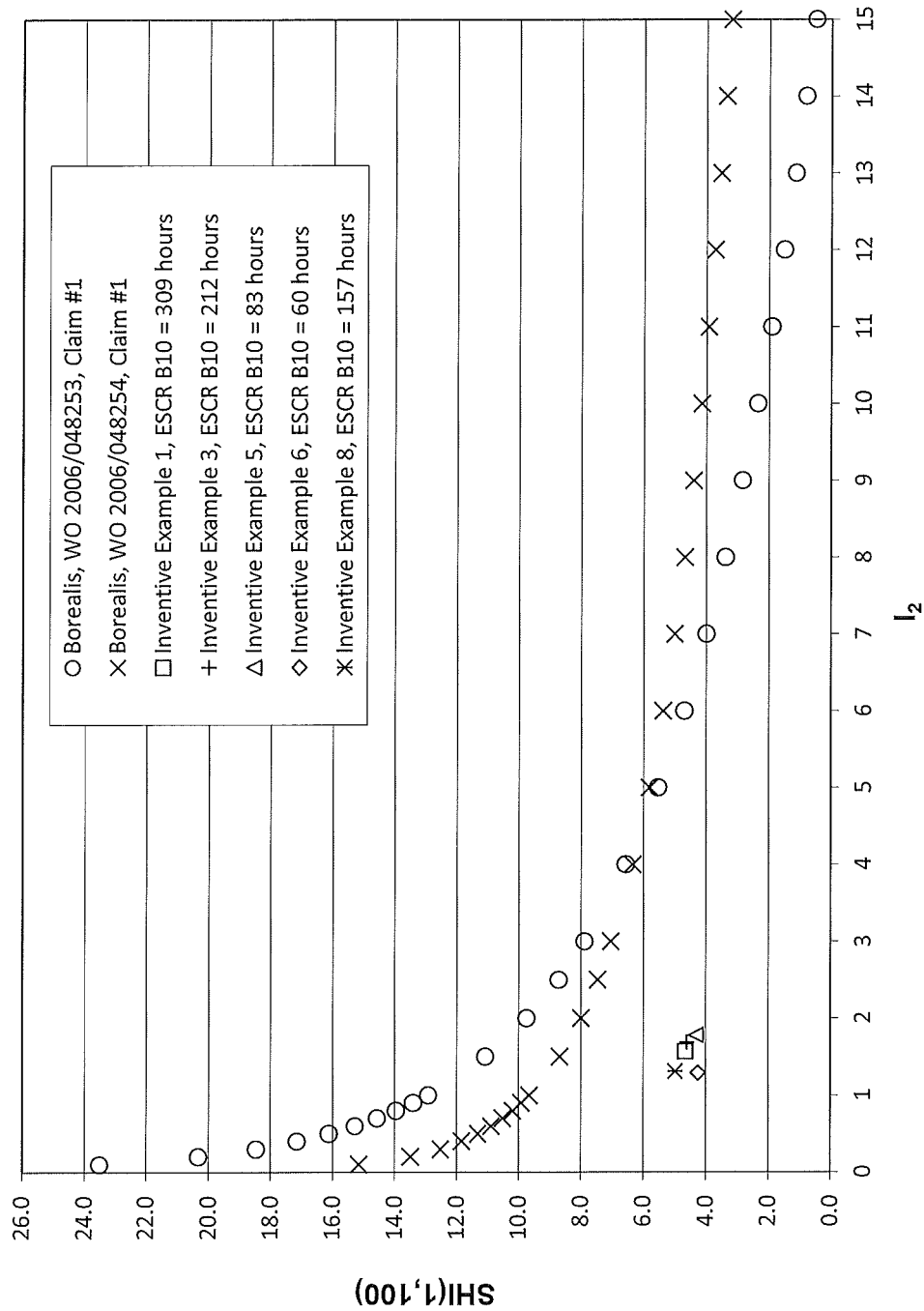
FIG. 5 shows the relationship between the shear thinning index SHI$_{(1,100)}$ and the melt index, I$_2$ of polyethylene compositions of the current invention.

As shown in FIG. 5, the inventive polyethylene compositions 1, 3, 5, 6 and 8 do not satisfy the equation $SHI_{(1,100)} \geq -10.58$ (log $I_2$ of the polyethylene composition in g/10 min)/(g/10 min)+12.94, which is a property of the blends taught in WO 2006/048253. As shown in FIG. 5, the inventive polyethylene compositions 1, 3, 5, 6 and 8 do not satisfy the equation: $SHI_{(1,100)} \geq -5.5$ (log $I_2$ of the polyethylene composition in g/10 min)/(g/10 min)+9.66, which is a property of the blends taught in and WO 2006/048254.

Figure 6:
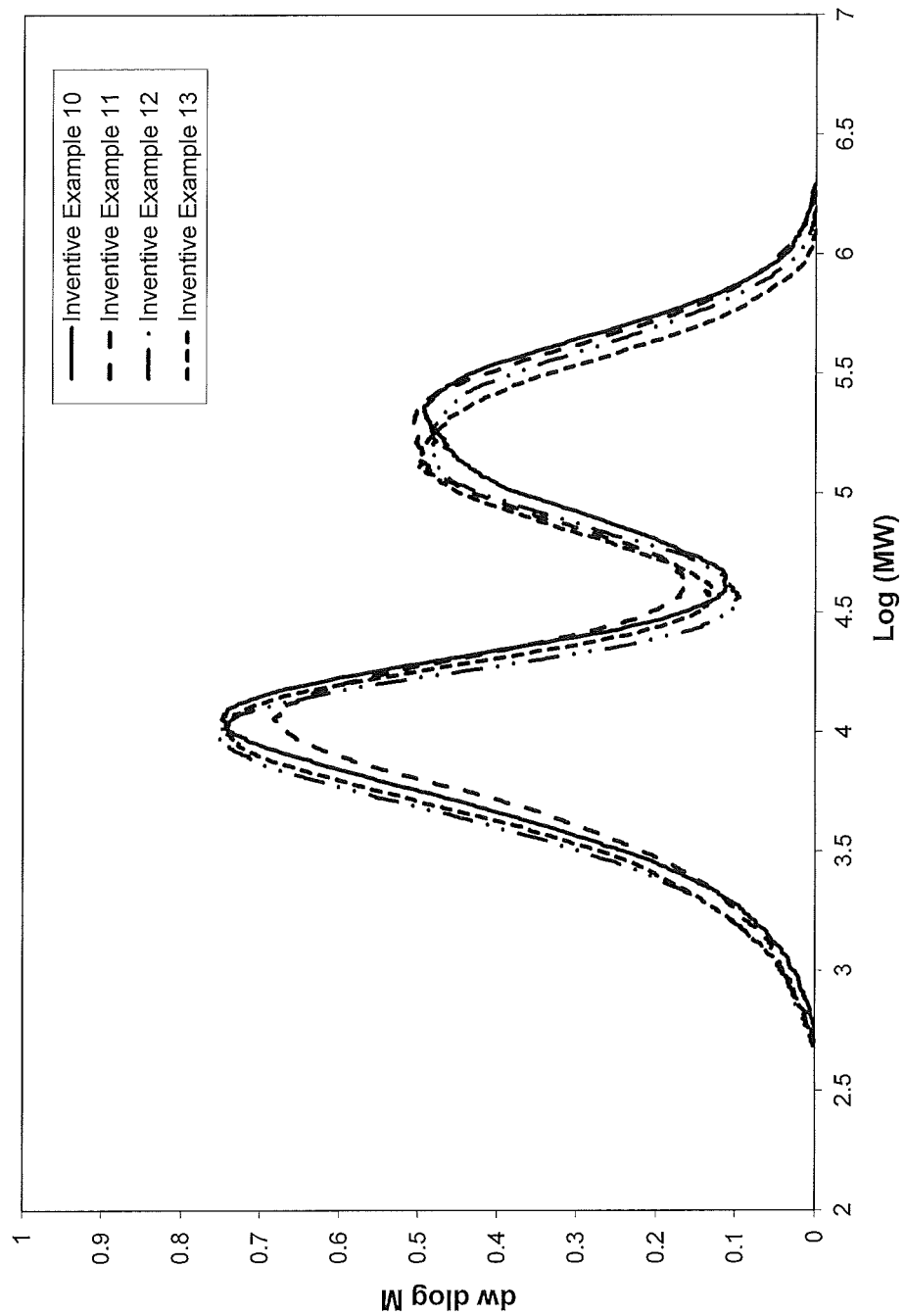
FIG. 6 shows a gel permeation chromatograph for inventive polyethylene compositions Nos 10-13.

FIG. 6 shows the bimodal nature of the inventive polyethylene compositions 10-13. Each ethylene copolymer component has a $M_w/M_n$ value of less than 2.5.

Figure 7:
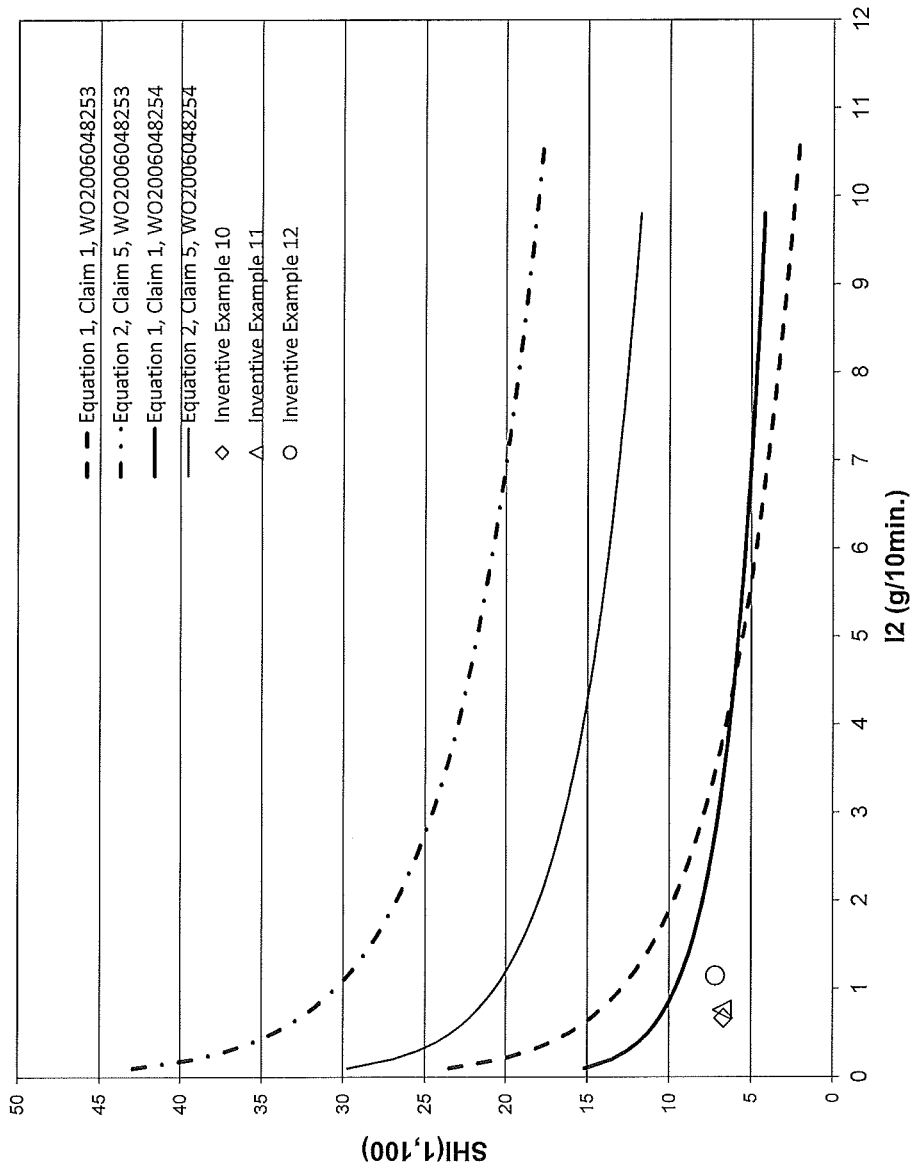
FIG. 7 shows the relationship between the shear thinning index SHI$_{(1,100)}$ and the melt index, I$_2$ of polyethylene compositions of the current invention (inventive polyethylene composition examples Nos 10-13).

As shown in FIG. 7, the inventive polyethylene compositions 10-13 do not satisfy the equation $SHI_{(1, 100)} \geq -10.58$ (log $I_2$ of the polyethylene composition in g/10 min)/(g/10 min)+12.94, which is a property of the blends taught in WO 2006/048253. As shown in FIG. 7, the inventive polyethylene compositions 10-13 do not satisfy the equation: $SHI_{(1,100)} \geq -5.5$ (log $I_2$ of the polyethylene composition in g/10 min)/(g/10 min)+9.66, which is a property of the blends taught in and WO 2006/048254.

What is claimed is:

1. A closure, said closure comprising a bimodal polyethylene composition comprising:
   (1) 10 to 70 weight percent of a first ethylene copolymer having a melt index $I_2$, of less than 0.4 g/10 min; a molecular weight distribution $M_w/M_n$, of less than 3.0; and a density of from 0.920 to 0.955 g/cm³; and
   (2) 90 to 30 weight percent of a second ethylene copolymer having a melt index $I_2$, of from 100 to 10,000 g/10 min;
   a molecular weight distribution $M_w/M_n$, of less than 3.0; and a density higher than the density of said first ethylene copolymer, but less than 0.965 g/cm³;
   wherein the density of said second ethylene copolymer is less than 0.037 g/cm³ higher than the density of said first ethylene copolymer; the ratio (SCB1/SCB2) of the number of short chain branches per thousand carbon atoms in said first ethylene copolymer (SCB1) to the number of short chain branches per thousand carbon atoms in said second ethylene copolymer (SCB2) is greater than 1.0; and wherein said bimodal polyethylene composition has a molecular weight distribution $M_w/M_n$, of from 3 to 11; a density of at least 0.949 g/cm$^3$; a melt index $I_2$, of from 0.5 to 2.0 g/10 min, and a melt flow ratio 121/12 of from 40 to 100.

2. The closure of claim 1 wherein said bimodal polyethylene composition further comprises a nucleating agent.

3. The closure of claim 1 wherein said closure is made by compression molding or injection molding.

4. A bimodal polyethylene composition comprising:
  (1) 10 to 70 weight percent of a first ethylene copolymer having a melt index $I_2$, of less than 0.4 g/10 min; a molecular weight distribution $M_w/M_n$, of less than 2.7; and a density of from 0.920 to 0.955 g/cm$^3$; and
  (2) 90 to 30 weight percent of a second ethylene copolymer having a melt index $I_2$, of from 100 to 10,000 g/10 min; a molecular weight distribution $M_w/M_n$, of less than 2.7; and a density higher than the density of said first ethylene copolymer, but less than 0.967 g/cm$^3$;
  wherein the density of said second ethylene copolymer is less than 0.037 g/cm$^3$ higher than the density of said first ethylene copolymer; the ratio (SCB1/SCB2) of the number of short chain branches per thousand carbon atoms in said first ethylene copolymer (SCB1) to the number of short chain branches per thousand carbon atoms in said second ethylene copolymer (SCB2) is greater than 1.0; and wherein said bimodal polyethylene composition has a molecular weight distribution $M_w/M_n$, of from 3 to 11; a density of at least 0.949 g/cm$^3$; a melt index $I_2$, of from 0.5 to 5.0 g/10 min, a melt flow ratio 121/12 of from 40 to 100, and an Mz of less than 400,000.

5. The bimodal polyethylene composition of claim 4 wherein said first ethylene copolymer has a weight average molecular weight, $M_w$ of at least 110,000.

6. The bimodal polyethylene composition of claim 4 wherein said first ethylene copolymer has a weight average molecular weight, $M_w$ of from greater than 110,000 to less than 250,000.

7. The bimodal polyethylene composition of claim 4 wherein said first ethylene copolymer has a weight average molecular weight, $M_w$ of from 125,000 to 225,000.

8. The bimodal polyethylene composition of claim 4 wherein said second ethylene copolymer has a weight average molecular weight, $M_w$ of less than 45,000.

9. The bimodal polyethylene composition of claim 4 wherein said second ethylene copolymer has a weight average molecular weight, $M_w$ of from 7,500 to 23,000.

10. The bimodal polyethylene composition of claim 4 wherein said first ethylene copolymer has a density of from 0.925 to 0.950 g/cm$^3$.

11. The bimodal polyethylene composition of claim 4 wherein said bimodal polyethylene composition has a density of from 0.951 to 0.957 g/cm$^3$.

12. The bimodal polyethylene composition of claim 4 wherein the density of said second ethylene copolymer is less than 0.035 g/cm$^3$ higher than the density of said first ethylene copolymer.

13. The bimodal polyethylene composition of claim 4 wherein said second ethylene copolymer has a density of less than 0.965 g/cm$^3$.

14. The bimodal polyethylene composition of claim 4 wherein said bimodal polyethylene composition has a melt index $I_2$, of from 0.5 to 2.0 g/10 min.

15. The bimodal polyethylene composition of claim 4 wherein said bimodal polyethylene composition comprises: from 30 to 60 weight percent of said first ethylene copolymer; and from 70 to 40 weight percent of said second ethylene copolymer.

* * * * *